(12) United States Patent
Meulendijks et al.

(10) Patent No.: US 9,737,080 B2
(45) Date of Patent: Aug. 22, 2017

(54) MOULDING DEVICE, AND METHOD FOR MOULDING FOOD PRODUCTS

(71) Applicant: MAREL TOWNSEND FURTHER PROCESSING B.V., Boxmeer (NL)

(72) Inventors: Johannes Martinus Meulendijks, Deurne (NL); Franciscus Quirinus Fredrik Verouden, Sint Anthonis (NL); Wilhelmus Gerardus Maria Boom, Maashees (NL)

(73) Assignee: MAREL TOWNSEND FURTHER PROCESSING B.V., Boxmeer (NL)

( * ) Notice: Subject to any disclaimer, the term of this patent is extended or adjusted under 35 U.S.C. 154(b) by 220 days.

(21) Appl. No.: 14/762,143

(22) PCT Filed: Mar. 19, 2014

(86) PCT No.: PCT/NL2014/050165
§ 371 (c)(1),
(2) Date: Jul. 20, 2015

(87) PCT Pub. No.: WO2014/148897
PCT Pub. Date: Sep. 25, 2014

(65) Prior Publication Data
US 2015/0359234 A1   Dec. 17, 2015

(30) Foreign Application Priority Data
Mar. 19, 2013   (NL) ...................................... 2010482

(51) Int. Cl.
*A22C 7/00*   (2006.01)
*A23P 30/10*   (2016.01)

(52) U.S. Cl.
CPC .......... *A22C 7/0069* (2013.01); *A22C 7/0084* (2013.01); *A23P 30/10* (2016.08)

(58) Field of Classification Search
CPC ...... A22C 7/0069; A22C 7/0084; A23P 30/10
See application file for complete search history.

(56) References Cited

U.S. PATENT DOCUMENTS 2,812,729 A   11/1957   Bahlsen
3,724,026 A    4/1973   Gernandt
(Continued)

FOREIGN PATENT DOCUMENTS

EP         2 064 956 A1   6/2009
WO    WO 00/30458 A1      6/2000
(Continued)

*Primary Examiner* — James Mackey
(74) *Attorney, Agent, or Firm* — Birch, Stewart, Kolasch & Birch, LLP

(57) ABSTRACT

Molding device for molding three-dimensional food products from a mass of foodstuff which can be transferred by pumping, for example a meat mass of minced meat. The device comprises a molding drum (16) having a peripheral surface containing multiple series of cavities (44) extending in the peripheral direction. The device comprises a mass feed device which is arranged in a filling position with respect to the peripheral surface of the molding drum. The peripheral surface is embodied as a profiled peripheral surface having a shaping profile. Multiple shoe segments (42) are provided which are arranged next to one another and which have a profiled inner side with a profile which is in meshing engagement with the shaping profile. The shoe segments have freedom of movement with respect to one another, at least in the direction of the rotation axis, in order to each remain individually aligned with respect to the profile of the section with which the inner side of the shoe segment is in meshing engagement.

21 Claims, 15 Drawing Sheets

(56) References Cited

U.S. PATENT DOCUMENTS

| | | | |
|---|---|---|---|
| 4,418,446 | A | 12/1983 | Sandberg et al. |
| 4,872,241 | A | 10/1989 | Lindee |
| 4,886,441 | A | 12/1989 | Lortz |
| 6,398,540 | B1 | 6/2002 | Burroughs et al. |
| 2007/0184145 | A1 | 8/2007 | LaBruno et al. |
| 2012/0015065 | A1* | 1/2012 | Van Der Eerden .. A22C 7/0069 425/363 |
| 2012/0177786 | A1* | 7/2012 | Van Der Eerden ..... A23P 30/10 426/89 |

FOREIGN PATENT DOCUMENTS

| | | |
|---|---|---|
| WO | WO 2004/002229 A2 | 1/2004 |
| WO | WO 2005/107481 A2 | 11/2005 |
| WO | WO 2010/110655 A1 | 9/2010 |
| WO | WO 2011/005099 A1 | 1/2011 |
| WO | WO 2011/131372 A2 | 10/2011 |
| WO | WO 2012/012581 A1 | 1/2012 |

* cited by examiner

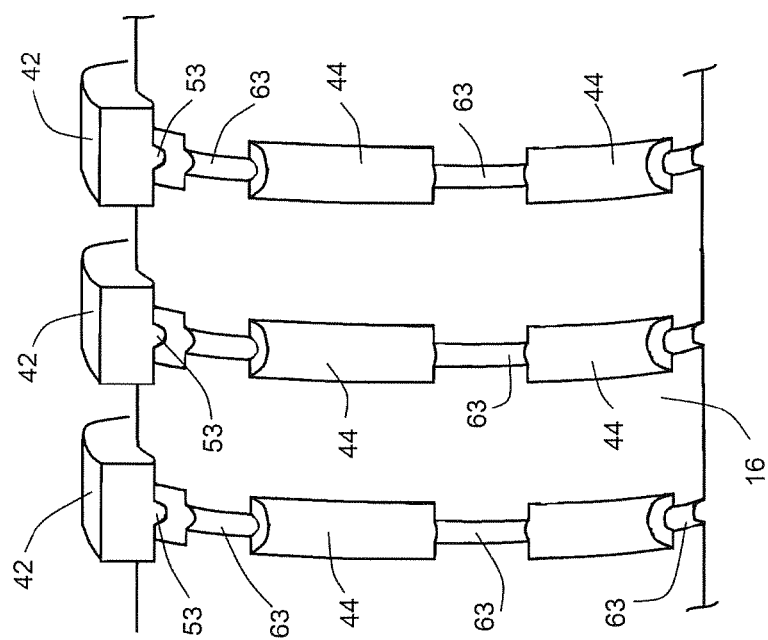

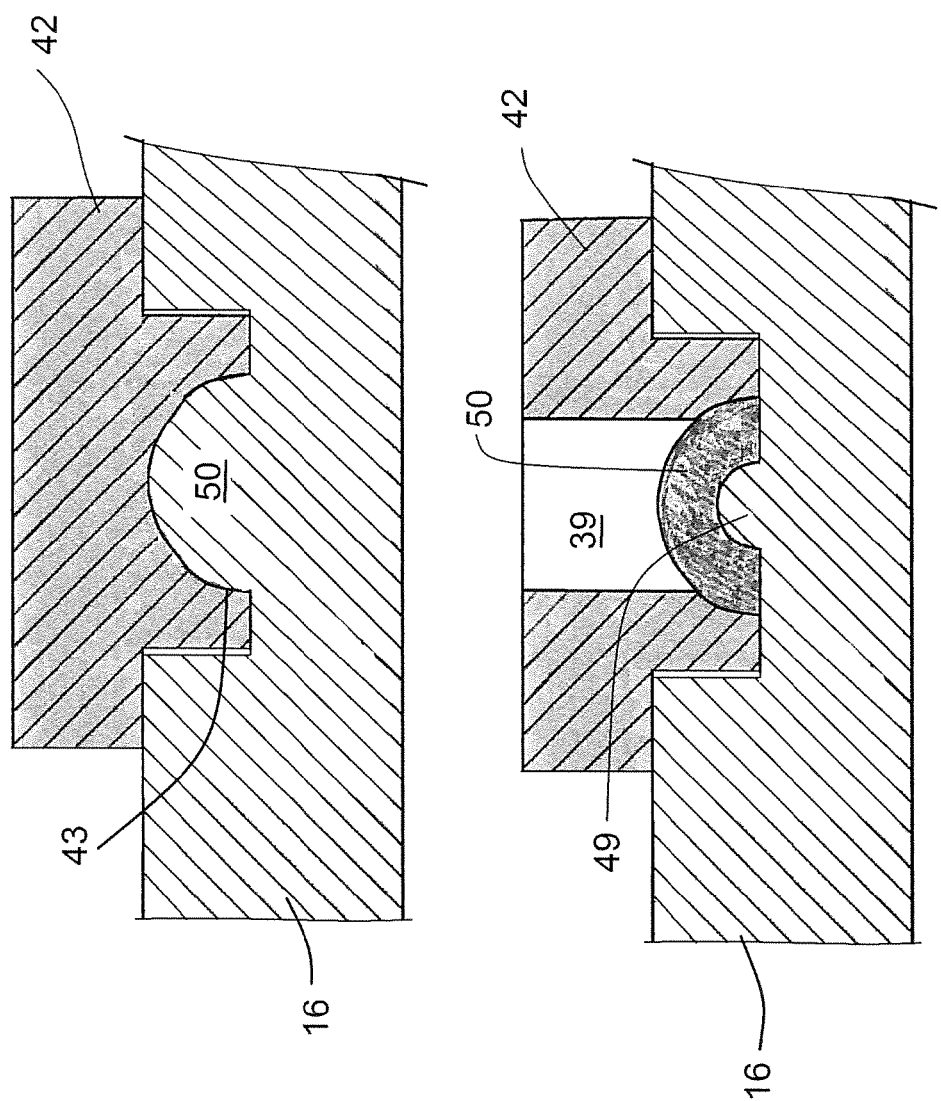

MOULDING DEVICE, AND METHOD FOR MOULDING FOOD PRODUCTS

FIELD OF THE INVENTION

The invention relates to a moulding device and a method for moulding three-dimensional food products from a mass of foodstuff which can be transferred by pumping, for example a meat mass of minced meat.

BACKGROUND OF THE INVENTION

A moulding device for moulding three-dimensional products from a mass of foodstuff is known, for example, from WO2004002229 and from WO2010110655. These known moulding devices comprise a moulding drum which is driven so as to rotate about an axial rotation axis by means of a drive motor. The moulding drum has a peripheral surface with multiple moulding cavities. During operation, the moulding cavities are filled with the foodstuff by means of a mass feed device which is supported by the frame and is arranged in a filling position with respect to the peripheral surface of the moulding drum. The foodstuff is fed to an inlet of the mass feed device by means of a pump.

In these known devices, the mass feed device comprises a curved and flexible plastic shoe plate having a curvature which corresponds to the moulding drum, which shoe plate has a flat side by means of which the shoe plate sealingly bears against the smooth cylindrical peripheral surface of the moulding drum. The shoe plate comprises a mouth which ends at the peripheral surface of the moulding drum in such a way that the moulding cavities which move past during rotation of the moulding drum come into communication with said mouth in order to fill the cavities with the foodstuff as they move past. In order to ensure sealing, these known mass feed devices comprise a pressure member for keeping the shoe plate firmly pressed against the peripheral surface of the moulding drum. In practice, the total pressing force on the shoe plate may amount to multiple tonnes, even more than 10 tonnes. These moulding devices make it possible to mould food products having a consistent shape, volume and weight at high capacity, for example made of minced meat, for example hamburgers or other such meat products.

It is also known in these known moulding devices to provide the bottom of the moulding cavities in the moulding drum with a profile, so that a product is moulded which has a profiled bottom side. The moulded product is then flat on the filling side.

OBJECT OF THE INVENTION

It is an object of the invention to provide an improved moulding device for moulding three-dimensional food products from a mass of foodstuff which can be transferred by pumping, for example a meat mass of minced meat.

SUMMARY OF THE INVENTION

The object is achieved according to the invention by means of a moulding device, which device is characterized in that the peripheral surface of the moulding drum is embodied as a profiled peripheral surface having a shaping profile which comprises, for each series of cavities, projections between multiple pairs of successive cavities of said series and/or one or more peripheral grooves which extend in the peripheral direction between and through the successive cavities of said series, and in that the shoe member is provided with multiple shoe segments which are arranged next to one another, viewed in the direction of the rotation axis, and in that each shoe segment of the shoe member has an inner side which adjoins an associated section of the peripheral surface of the moulding drum, which section comprises one or more series of cavities, wherein the inner side of each shoe segment is embodied as a profiled inner side having a profile which comprises, for each series of cavities, one or more grooves extending in the peripheral direction and/or ribs extending in the peripheral direction, which grooves and/or ribs are in meshing engagement with the shaping profile of said section, and in that each shoe segment of the shoe member comprises at least one passage which forms part of the filling mouth and which ends at the inner side of the shoe segment, so that, during rotation of the moulding drum, repeatedly a moulding cavity for moulding a food product, which moulding cavity comes into contact with a passage of the shoe segment, is delimited by the moulding drum and the shoe segment, and in that the shoe segments of the shoe member have freedom of movement with respect to one another, at least in the direction of the rotation axis, in order to each remain individually aligned with respect to the profile of the section with which the inner side of the shoe segment is in meshing engagement.

For example, the number of shoe segments is equal to the number of series of cavities of the moulding drum; each series of cavities of the moulding drum therefore has an associated shoe segment. However, it is also conceivable that for example several, for example two, adjacent series of cavities belong to one section and in this case one shoe segment is provided for said one section. That is conceivable, for example, if the cavities are relatively small, for example for products having the form of chicken nuggets.

The invention makes it possible to make the moulding drum and the shoe segments, at least the sides thereof which are adjoin one another, of different materials, for example one from metal and the other from plastic.

In a practical embodiment, the moulding drum is made from metal, which enables a long service life, a high dimensional stability and a precise shape and weight of the moulded products, and the shoe segments, or at least the part of the shoe segments which forms the inner side thereof, is made from plastic, for example of polyethylene.

By using multiple individually aligning shoe segments, the considerable difference in coefficient of thermal expansion between metal and plastic does not have any undesired negative influence on the alignment of the profiles in engagement, and for example excessive wear of the plastic shoe segment and/or undesired leakage between the moulding drum and a shoe segment are prevented.

The invention is also advantageous in terms of the possible wear of the shoe segments, for example if these (or at least the part which forms the inner side) are made of plastic. The individual mobility of each shoe segment can provide the desired contact against the section of the moulding drum while maintaining the correct alignment, despite an individual degree of wear of each shoe segment.

If provision is made for the use of a pressure member in order to press each of the shoe segments against the peripheral surface of the moulding drum by means of a pressure force, such as is preferable in order to ensure the desired sealing, the use of the shoe segments according to the invention has the advantage that mechanical deformations of each shoe segment are permissible without this having any negative influence on the alignment of the other shoe segments.

Preferably, the shoe segments are easily detachable from the shoe member, for example by means of detachable fastening means, for example by one or more bolts. In one embodiment, the entirety of each shoe segment is not attached using fastening means but is configured to be enclosed between the moulding drum and a part of the shoe member which comes to rest against the outer side of the shoe segments, for example between the moulding drum and a back plate of the shoe member, which back plate covers all of the shoe segments.

For example, the shoe segments bear with their outer side against a back plate which covers all of the shoe segments, for example a back plate made of plastic material. The back plate preferably forms a sliding surface with which the shoe segments are in sliding contact, for example at least sliding in the direction of the rotation axis. For example, the shoe segments are made of plastic and the back plate is also made of plastic.

For example, the shoe segments bear with their outer side against a flexible back plate, wherein pressure elements are present on the side of the back plate which is remote from the shoe segments in order to exert a pressure force which presses the flexible back plate, and with it the shoe segments, towards the moulding drum. Preferably, the pressure elements are configured to be elastically resilient, for example with metal springs, pneumatic and/or hydraulic actuators, etc.

For example, the shoe segments bear with their outer side against a back plate, optionally a flexible back plate, which covers all of the shoe segments, wherein the back plate is provided with passages which are each connected to a passage in a shoe segment, so that the foodstuff which is transferred by means of the pump reaches the cavities which move past via the adjoining passages.

For example, provision is made for rod-shaped food products to be moulded, for example rod-shaped food products which have a cylindrical cross section, for example in the form of a potato croquette or a correspondingly dimensioned product of minced meat. The shoe segments of the shoe member then preferably each comprise one groove extending in the peripheral direction which has the form of a semicircle in cross section. In a possible embodiment in which the moulding drum also forms the base of each cavity, the cavities also have the form of a semicircle in cross section. The peripheral surface of the moulding drum comprises one projection between each two successive cavities of each series.

In that case, the shoe segments each adjoin the peripheral surface of the moulding drum by means of an inner side comprising the groove, wherein the projections come into meshing engagement with said groove during rotation of the moulding drum. A passage is arranged through each shoe segment, which passage forms part of a filling mouth, i.e. the foodstuff is dispensed via the passage, in this example in the groove of the shoe segment. During rotation of the moulding drum, the shoe segment, together with each cavity of the respective series which moves past, thus delimits a moulding cavity for moulding a food product, wherein end faces of the projections adjacent to the cavity form the ends of the food product.

The manufactured product is dispensed from the moulding cavity at a release position of the trajectory of the moulding cavity. In possible embodiments, one or more wall parts of the cavity are made from a porous material, for example porous metal, for example porous sintered metal, and the moulding drum is provided with one or more air ducts which make it possible to selectively connect the porous wall parts to a source of pressurized air in order to facilitate the release of the moulded product from the cavity. In a possible embodiment, provision is made for end faces of projections adjacent to the cavity to also be made of porous material, so that pressurized air can flow out of said end faces in order to release the moulded product.

In a possible embodiment, the moulding device is configured to produce elongate rod-shaped food products, each of a considerable length, such as a sausage product of minced meat, in such a way that a curvature can also be seen in the longitudinal direction as a result of the curvature of the periphery of the moulding drum. For many products, that is not a problem, for example because one or more subsequent processing steps may give the product a straighter form. For example, curved products may be rotated multiple times about their longitudinal axis over a flat surface or between flat surfaces by a subsequent device, as a result of which the products are straightened out.

In a possible embodiment of the moulding device, provision is made for rod-shaped products to be moulded using the moulding device, wherein the length of the moulded products is substantially equal to the diameter which is substantially constant over the length, for example wherein the ratio between the length and the diameter of the moulded product is between 1.30:1 and 0.70:1. This produces a stump-shaped product. If a product of this type is made of meat and if it is subsequently subjected to a deep-frying process, it becomes more or less spherical as a result of shrinkage and therefore resembles a small meatball.

The individual freedom of movement of the shoe segments is also advantageous in terms of preventing possible undesired seams in the moulded products, since the intended alignment of the shoe segments and shaping profiles of the moulding drum which are in engagement with one another is ensured, even after a long operating time.

The use of shoe segments having a profile makes it possible to manufacture food products having a traditional appearance, for example hamburgers with a ribbed pattern on the filling side of the product defined by the shoe segment, wherein the opposed bottom of the product may also have a ribbed pattern, optionally with ribs in the bottom which run in a different direction to the ribs defined by the shoe segment.

It should be noted that the shaping profile may have all kinds of variants, for example a profile having multiple parallel ribs as projections between successive moulding cavities in order to mould a product having a ribbed pattern on this side.

Other variants are also conceivable, such as providing one or more peripheral grooves in the peripheral surface of the moulding drum, which one or more peripheral grooves intersect the cavities. In this case, each shoe segment is provided with a corresponding profile having one or more peripheral ribs, each of which is in meshing engagement with a peripheral groove in the associated section of the moulding drum. A shaping profile which is composed of a combination of one or multiple projections next to one another and one or more peripheral grooves is also conceivable, for example in order to provide the product with one or more outwardly curving zones on this side, in combination with one or more inwardly curving zones.

In a possible embodiment, products which have, for example, a C-shaped cross section can be produced. In this case, the cavities are embodied as cavities which have a semicircular cross section of a first diameter, and a peripheral groove is provided which has a semicircular cross section of a second, smaller diameter, which peripheral groove intersects the cavities. In that case, the shoe segment is provided with a rib which fits into the peripheral groove, so that effectively a C-shaped moulding cavity remains from each cavity at the moment when the filling mouth is being filled with the foodstuff (via one or more passages in the shoe segment).

Instead of a cavity between two moulding drum projections which follow one another in the peripheral direction, provision may also be made for the area of the moulding drum which is situated between two successive projections to be designed in a different way.

In an embodiment, there is no recessed cavity present between successive projections of the moulding drum, but one or more ribs or a differently shaped relief of that area of the moulding drum is provided. For example, one single rib which extends in the peripheral direction is present between two successive projections in the peripheral direction, wherein the cross section of the ridge, or the differently shaped relief, is smaller than that of the projections. The single rib has a semicircular cross section, for example, and the projections also have a semicircular cross section, with the central axes coinciding. A product which is substantially C-shaped is thus obtained. The one or more ribs between successive projections can each have a constant cross-sectional form, viewed over their length between the projections, but a varying cross section is also conceivable.

It is also conceivable that a cavity or other relief in the area between two successive projections in the peripheral direction, for example a rib, does not connect to one or both projections, but ends at a distance from one or both projections (viewed in the peripheral direction). The relief may comprise one or more bumps, for example, which are each at a distance from one another and from the projections so that a product is formed having one or more dents in the relevant side.

The invention also relates to a moulding device for moulding three-dimensional food products from a mass of foodstuff which can be transferred by pumping, for example a meat mass of minced meat, comprising:
 a frame,
 a moulding drum which is connected to the frame so as to be drivable and rotatable about a rotation axis, wherein the moulding drum has a peripheral surface,
 a mass feed device which is arranged in a filling position with respect to the peripheral surface of the moulding drum, wherein the mass feed device is provided with:
 an inlet for feeding the foodstuff by means of a pump,
 a shoe member which adjoins the peripheral surface of the moulding drum, wherein the shoe member comprises a filling mouth which is connected to the inlet and ends at the peripheral surface of the moulding drum,
which device is characterized in that the peripheral surface of the moulding drum is embodied as a profiled peripheral surface having a shaping profile which comprises multiple series of projections extending in the peripheral direction, which projections in a series are at a distance from one another in the peripheral direction, and wherein the series extend substantially parallel to and at a distance from one another, viewed in the direction of the rotation axis,
and in that the shoe member is provided with multiple shoe segments which are arranged next to one another, viewed in the direction of the rotation axis,
and in that each shoe segment has an inner side which adjoins an associated section of the peripheral surface of the moulding drum, which section comprises one or more series of projections, wherein the inner side of each shoe segment is embodied as a profiled inner side having a profile which comprises one or more grooves extending in the peripheral direction for each series of projections, which grooves are in meshing engagement with the shaping profile of said section,
and in that each shoe segment comprises at least one passage which forms part of the filling mouth and which ends at the inner side of the shoe segment, so that, during rotation of the moulding drum, repeatedly a space for moulding a food product, is delimited by the moulding drum and the shoe segment which space comes into contact with a passage of the shoe segment,
and in that the shoe segments have freedom of movement with respect to one another, at least in the direction of the rotation axis, in order to each remain individually aligned with respect to the profile of the section with which the inner side of the shoe segment is in meshing engagement.

In a possible embodiment of the moulding device described above, a relief having one or more cavities is provided between successive projections in the peripheral direction. In another embodiment, or optionally even in combination with one or more cavities, an outwardly protruding relief is provided between successive projections in the peripheral direction, wherein said relief has a smaller cross section than the projections. For example, one or more ribs are provided between successive projections, but an entirely different relief is also possible.

In a possible embodiment, products can be moulded, for example, having a top part which comprises one or multiple parallel upper rod parts, and having a bottom part which comprises one or more bottom rod parts arranged at an angle with respect thereto, wherein the rod parts of the top and bottom layers intersect one another and are integral with one another at each intersection. In this way, for example, it is possible to manufacture a grid-shaped product.

Keeping each individual shoe segment aligned with respect to the shaping profile of the associated section of the moulding drum can be effected in various different ways.

Preferably, the shoe segments each remain individually aligned by virtue of the meshing engagement of the inner side of the shoe segment with the shaping profile of the section with which the inner side of the shoe segment is in engagement. As a result, no additional features are required to ensure the alignment. For example, provision may be made for the shoe segment to be in meshing engagement with the shaping profile at multiple different locations at any time, for example at two locations in the peripheral direction of the shoe segment. If, for example, two successive projections are continuously in meshing engagement with a groove of a shoe segment during rotation of the moulding drum, said projections respectively advancing ahead of and following an intermediate cavity or other relief, said engagement may be sufficient to maintain the desired alignment, so that the shoe segment is also correctly aligned with respect to a following "projection running in the groove".

In another variant, the alignment is not, or at least not primarily, established on the basis of the shaping profile, and the section of the peripheral surface of the moulding drum comprises a separate alignment guide next to the shaping profile and at a distance from the cavities in said section, which alignment guide interacts with the respective shoe segment for the individual alignment thereof.

For example, the profile of the inner side of each shoe segment—viewed in the direction of the rotation axis—is in engagement with the shaping profile of the associated section of the peripheral surface of the moulding drum with a first tolerance, wherein the alignment guide—viewed in the direction of the rotation axis—interacts with the shoe segment with a second tolerance which is less than the first tolerance.

For example, one of the sections of the peripheral surface and of the inner side of the shoe segment is provided with an alignment groove extending in the peripheral direction and the other is provided with one or more alignment projections in meshing engagement therewith, for example an alignment rib extending circumferentially.

In this case, the alignment guide is more precise than the alignment provided by means of the profile of the shoe segments and the shaping profile of the moulding drum, so that the separate alignment guide governs the alignment of the shoe segment.

The separate alignment guide may also be used to obtain a sealing, optionally an additional sealing, between each shoe segment and the moulding drum, particularly in the axial direction, for example a barrier to prevent foodstuff leaking away into cavities of adjacent series.

In an embodiment, the shoe segments each have an outer side, wherein the shoe member is provided with a back plate which extends over the outer sides of several, preferably all, of the shoe segments so that the shoe segments are arranged between the back plate and the moulding drum, wherein the back plate comprises passages for the foodstuff which are connected to the passages of the shoe segments. If an open gap is present between adjacent shoe segments, the back plate then covers said open gap so that the gap is not connected to the filling mouth.

In a practical embodiment, the back plate, viewed in the direction of the rotation axis, is provided at its axial ends with a collar extending in the peripheral direction and protruding towards the moulding drum, wherein the peripheral surface of the moulding drum is provided with a collar opposite each of said collars, which collar extends in the peripheral direction and protrudes towards the back plate, wherein the shoe segments are arranged next to one another in the axial region between the pairs of collars of the back plate and of the peripheral surface of the moulding drum which lie opposite one another. The shoe segments are therefore enclosed with play, as it were, between the pairs of collars.

The invention also provides for a possibility, if desired, to use the moulding device in combination with a moulding drum having a smooth cylindrical peripheral surface which adjoins the mass feed device and with a shoe plate in the mass feed device which bears against the smooth cylindrical peripheral surface, as explained, for example, in WO2004002229 and WO2010110655. Preferably, the shoe segments and a back plate which is optionally present can then be detached from the mass feed device and said parts can be replaced by a shoe plate, preferably a flexible shoe plate, preferably without the removal of an optional pressure member, as explained in the prior art.

The easy detachability, particularly of the shoe segments, can also be exploited if one profiled moulding drum is replaced by another profiled moulding drum having a different profile, as a result of which different shoe segments and possibly also a different back plate are necessary.

In an embodiment, the outer periphery of each shoe segment is not rotationally symmetrical about the rotation axis, so that the shoe segment remains stationary, viewed in the peripheral direction, as a result of a form-fit in the peripheral direction with the part against which the shoe segment rests. For example, there is a flat surface around the entrance of the passage of the shoe segment, and/or a cam or the like is present, wherein the outer side of the shoe segment upstream and downstream thereof substantially has the shape of a segment of a circle. For example, a back plate is provided having a corresponding shape of the sliding surface against which the shoe segments rest. As a result, it is possible to ensure in a simple way, namely on the basis of a form-fit, that the shoe segments remain reliably fixed in the peripheral direction but are individually freely movable in the direction of the rotation axis in order to perform an aligning movement. Such locking of the shoe segment in the rotational direction based on a form-fit may also be provided at a different location, for example near an upstream and/or downstream end part of the shoe segment.

Preferably, an open gap is present between adjacent shoe segments so that each shoe segment has an individual freedom of movement in order to remain individually aligned with respect to the profile of the section with which the inner side of the shoe segment is in engagement. The gap optionally contains a readily compressible stuffing, for example a soft plastic foam, but an open gap is preferred.

The shoe segments may be embodied in various different ways.

Preferably, the shoe segments are each formed as a separate part, for example from plastic, optionally by injection moulding.

In a possible embodiment, the shoe segments are connected to one another and/or to a common carrier, for example a back plate, by means of flexible connecting parts. For example, the shoe segments, or at least a group of segments, are made of a monolithic block of plastic, with a gap being produced between adjacent shoe segments in such a way that all that remains is one or more flexible connecting parts, for example as a sort of spring, so that the intended free movability of the individual shoe segments is achieved.

In an embodiment, the shoe segments are produced separately and then connected to one another by means of flexible connecting parts which are so flexible that the shoe segments have said freedom of movement with respect to one another. Springs are arranged between the shoe segments, for example.

If the shoe segments are flexibly connected to one another and/or to an optional back plate, the shoe segments can be manipulated together and easily fitted or positioned in one go, for example. The flexible connecting parts between the shoe segments have a stiffness which is lower than the stiffness of the shoe segments themselves. As a result, the shoe segments have sufficient freedom of movement with respect to one another to be aligned with the desired precision by the aligning means during rotation of the moulding drum.

In an embodiment, the mass feed device comprises a pressure member for keeping the shoe segments of the shoe member pressed against the peripheral surface of the moulding member. The pressure member is preferably provided with one or multiple elongate pressure elements situated at a distance from one another in the peripheral direction, each of which is arranged substantially parallel to the rotation axis of the moulding drum and each of which exerts a pressing force on several, preferably all, of the shoe segments. The pressure elements are preferably configured to each allow the pressure force to be set separately, so that the shoe segment—viewed in the peripheral direction—can be loaded with a different pressure at different peripheral locations.

For example, each pressure element comprises an actuator which is expandable under fluid pressure. During operation, the actuator of the pressure element is connected to a source of pressurized pressure fluid, for example pressurized air. The actuator is formed, for example, by an elongate hose-shaped bellows.

In a practical embodiment of the pressure member, each elongate pressure element comprises an elongate intermediate bar which is arranged substantially parallel to the rotation axis of the moulding drum, wherein an actuator which is expandable under fluid pressure is arranged between a housing of the shoe member and the intermediate bar, wherein the expandable actuator engages with the intermediate bar in order to exert a pressure force on the shoe members via the intermediate bar. The intermediate bar therefore distributes the pressure force over several, preferably all, of the shoe segments.

A shoe segment may be embodied to have a substantially uniform cross section, viewed in the peripheral direction, in such a way that the shoe segment has a substantially uniform stiffness in this direction. However, provision may be made for the shoe segment to intentionally not have a uniform cross section in this direction, but to have for example one or more parts of tapering design so that the stiffness gradually increases from a relatively low value—at the smaller cross section—to a relatively high value—at the larger cross section. For example, the shoe segment is more flexible in an entry part at the upstream side of the shoe segment and the stiffness increases, optionally gradually, in the direction of the passage of the shoe segment which is situated in a central part. It is also possible for the downstream exit part of the shoe segment to be less stiff than a central part where the passage for the foodstuff is provided.

It will be clear that a shoe segment with parts which have different degrees of stiffness, viewed in the peripheral direction, for example with one or more flexible parts which connect the stiffer parts to one another, can also be produced by locally reinforcing and/or weakening the body of the shoe segment. Such an embodiment may be used advantageously in combination with a pressure member which can exert different pressure forces on the shoe segments, viewed in the peripheral direction.

The moulding drum and the shoe segments may be embodied in various different ways. Preferably, at least the peripheral surface of the moulding drum is made of metal, and the shoe segments are made of plastic, for example polyethylene. A metal moulding drum has a long service life and high dimensional stability, which is advantageous for the precision of the shape and weight of the moulded products. Plastic shoe segments are relatively inexpensive and can be made and replaced in a simple manner. Using different materials for the moulding drum and the shoe segments, such as a steel moulding drum and plastic shoe segments, leads to different coefficients of thermal expansion, but as a result of the invention these do not have a negative effect on the desired alignment of the shoe segments.

In a possible embodiment, the cavities are formed as inserts which are fitted into corresponding sockets in the moulding drum, optionally in a releasable manner. For example, the inserts are made of porous material, for example sintered metal, so that a selective supply of air which is known per se promotes the release of the product from the cavity.

In one possible embodiment, the moulding drum is partially made from porous material, with the pores being open in the region where the moulded food product bears against the moulding drum, so that by supplying pressurized gas, for example air, from inside, the air flowing out of the pores discontinues the adhesion of the product to the moulding drum. The moulding device is then provided with a gas supply which supplies gas to the moulding drum at the release position, for example via one or more ducts in the moulding drum as is known from the prior art. Preferably, only the end faces of a projection are provided with open pores. The end faces are situated at the ends of the projections, viewed in the peripheral direction. The rest of the projection is therefore provided with a closed surface; for example, the entirety of the projection is made of porous materials and the pores in the closed surface are closed.

In an embodiment, the cavities are each closed off at the side opposite the filling opening by a bottom which forms part of the moulding drum. In this case, each cavity of the moulding drum comprises a bottom which is integral with the moulding drum. In other words, each cavity of the moulding drum is closed at the side opposite the filling opening. The bottom of each cavity rotates along with the moulding drum during rotation of the moulding drum.

In an alternative embodiment of the moulding device, the moulding drum is tubular and has an outer and an inner peripheral surface. In this case, the shoe member of the mass feed device adjoins to one of said peripheral surfaces, for example the outer peripheral surface, wherein the cavities are each formed by a through-opening in the tubular moulding drum, and wherein the moulding device has a base member which is arranged so as to be stationary—i.e. not rotating along with the moulding drum—with respect to the frame and opposite the shoe member, for example in the tubular moulding drum. The base member is then adjoining the other peripheral surface, for example the inner peripheral surface, of the tubular moulding drum, so that the cavities are each closed off by a bottom defined by the base member at the side opposite the filling opening.

In an advantageous embodiment, the products are also provided with a profile on the base member side, so that the product has a profile both on the filling side and on the base side when a tubular moulding drum is used.

Preferably, the technique of individually aligning shoe segments can also be used in combination with the base member. In this case, the peripheral surface at the base side of the tubular moulding drum, for example the inner peripheral surface, is embodied as a profiled peripheral surface having a shaping profile which comprises, for each series of cavities, projections between multiple pairs of successive cavities of said series and/or one or more peripheral grooves which extend in the peripheral direction between and through the successive cavities of said series, wherein the base member is provided with multiple shoe segments which are arranged next to one another, viewed in the direction of the rotation axis, and wherein each shoe segment of the base member has an inner side which is adjoins an associated section of the relevant peripheral surface of the moulding drum, which section comprises one or more series of cavities, wherein the inner side of each shoe segment is embodied as a profiled inner side having a profile which comprises, for each series of cavities, one or more grooves extending in the peripheral direction and/or ribs extending in the peripheral direction, which grooves and/or ribs are in meshing engagement with the shaping profile of said section, and wherein the shoe segments of the base member have freedom of movement with respect to one another at least in the direction of the rotation axis, in order to each remain individually aligned with respect to the profile of the section with which the inner side of the shoe segment is in meshing engagement.

It will be clear that the use of individually aligning shoe segments is also advantageous in combination with a base member in a moulding device having a tubular moulding drum.

In a possible embodiment, a mass feed device is provided which feeds mass into the passing cavities at two filling positions situated at a distance from one another in the peripheral direction, for example in order to make a layered product. It is possible for two different foodstuffs to be supplied by using two pumps and two shoe members which are each connected to an associated pump via an associated filling mouth and inlet. Two pumps could also be used to simultaneously supply two different foodstuffs to a shoe member, possibly with a distributor in the shoe member and with multiple passages for each shoe segment which each dispense a specific foodstuff to cavities which move past, for example as adjacent strips in a cavity or in adjacent cavities.

In the technique of moulding three-dimensional products from a mass of foodstuff which can be transferred by pumping, for example of meat mass of minced meat, use is also made of so-called moulding plate devices which comprise a moulding plate and a moulding plate drive. In this case, the moulding plate has a length and a width and the moulding plate is connected to the frame so as to be movably drivable to and fro in its longitudinal direction. The invention described herein which relates to devices having a rotating moulding drum and the possible details thereof can also be used in combination with a moulding plate which moves to and fro. That is possible at the filling side of the moulding plate, in other words near the mass feed device, but also on the base side near the base member, or if possible both near the mass feed device and near the base member, in other words on either side of the moulding plate.

It will be clear that one or more details of the shoe segments and/or their integration in the moulding device, such as the use of a back plate and/or a pressure member, which are explained herein with reference to a particular moulding device are also applicable in combination with a different type of moulding device explained herein. Optional details which are described in the subclaims of this applications are also applicable in combination with other independent claims of this application, unless technically incompatible therewith.

The invention also relates to a method for moulding three-dimensional products from a mass of foodstuff which can be transferred by pumping, for example a meat mass of minced meat, for example of beef, chicken or fish, wherein use is made of a moulding device as described here. The method may also comprise a step of deep-frying the moulded products. The invention also relates to products moulded using the method according to the invention.

The invention will be explained below with reference to the figures.

DETAILED DESCRIPTION OF EMBODIMENTS

Figure 1:
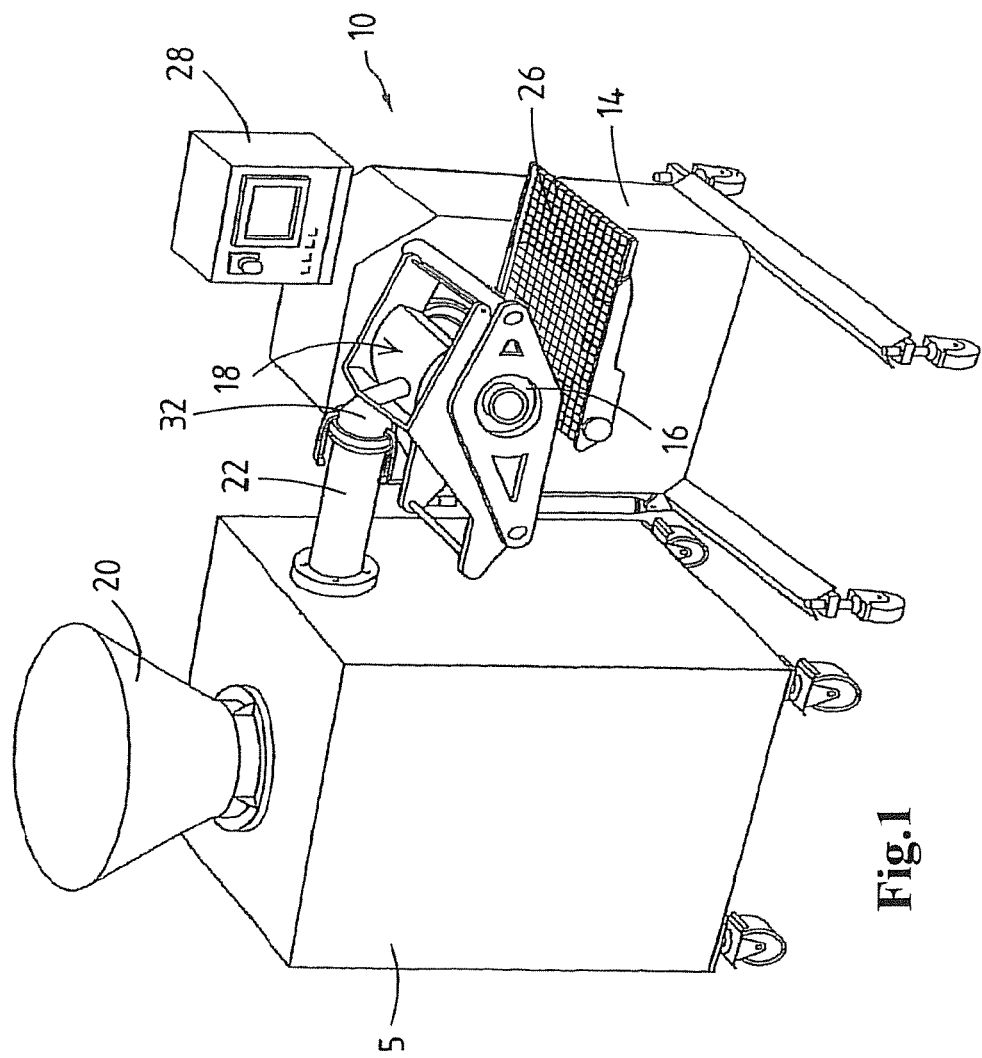
FIG. 1 shows a diagrammatic perspective view of a first embodiment of a moulding device according to the invention.

FIG. 1 shows an exemplary embodiment of a moulding device 10 for moulding products from a mass of foodstuff which is to be transferred by pumping and is suitable for consumption, for example a meat mass of minced meat.

The moulding device 10 comprises a frame 14, a moulding drum 16, a mass feed device 18 and a discharge device 26 for moulded products. The moulding device 10 can be operated by means of a control device 28.

Figure 4:
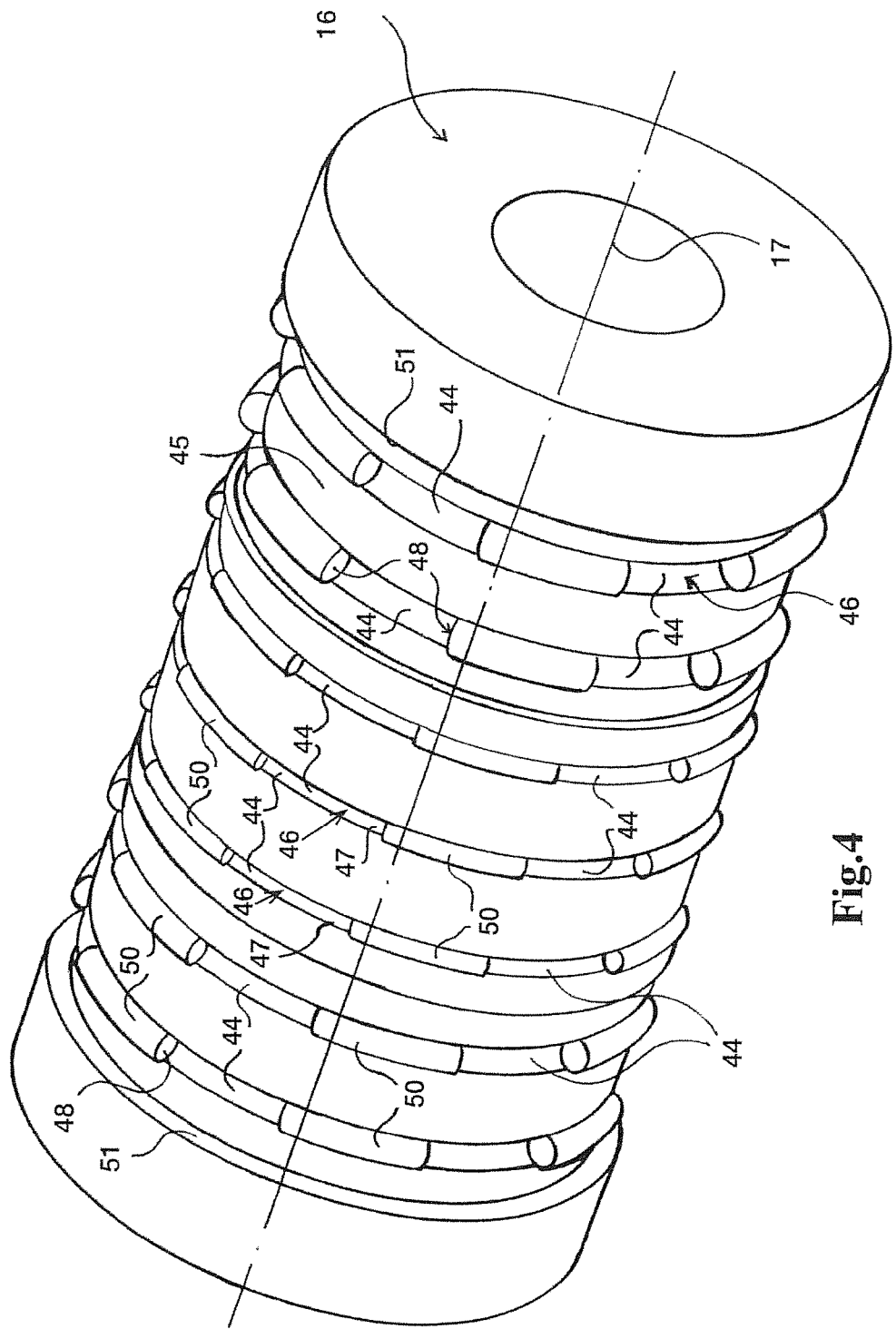
FIG. 4 shows a perspective view of the moulding drum of the moulding drum illustrated in FIGS. 2 and 3.

The moulding drum 16 is drivable and rotatable about a substantially horizontal rotation axis 17 shown in FIG. 4. In this exemplary embodiment, the moulding drum 16 is rotatably suspended from a mobile frame 14 having wheels.

The moulding drum 16 can be rotatably driven by a drive device, such as an electric motor (not shown). As is preferred, the moulding drum 16 rotates continuously during operation. The mass feed device 18 is arranged in the frame 14 in a filling position with respect to the peripheral surface of the moulding drum 16 (see FIG. 1). The mass feed device 18 has an inlet 32 for supplying the foodstuff to the mass feed device 18. A pump 5 which is detachably coupled to the inlet 32 is provided in order to move the foodstuff towards the moulding drum 16. The pump is, for example, a so-called "positive displacement pump", such as a vane pump or a screw pump. The pump works (semi-)continuously during operation, for example.

The inlet 32 of the mass feed device 18 is connected to a pump unit 5 upstream by means of a detachable connecting pipe 22, said pump unit 5 also being provided with a storage container, embodied here as a funnel 20, into which batches of foodstuff are released.

The foodstuff reaches the pump via the introduction funnel 20 and is then transferred to the inlet 32 by pumping. The inlet 32 is connected downstream to a shoe member 24 of the mass feed device which sealingly bears against a peripheral part of the peripheral surface 45 of the moulding drum 16. The shoe member 24 is illustrated in more detail in FIGS. 2 and 3.

The moulding drum 16 comprises an outer peripheral surface 45 containing multiple series of cavities 44 extending in the peripheral direction. The series of cavities 44 are situated substantially parallel to and at a distance from one another, viewed in the direction of the rotation axis 17 (see FIGS. 2 to 4). Each series of cavities comprises multiple cavities 44 which are at a distance from one another, viewed in the peripheral direction of the peripheral surface 45 of the moulding drum 16.

Figure 2:
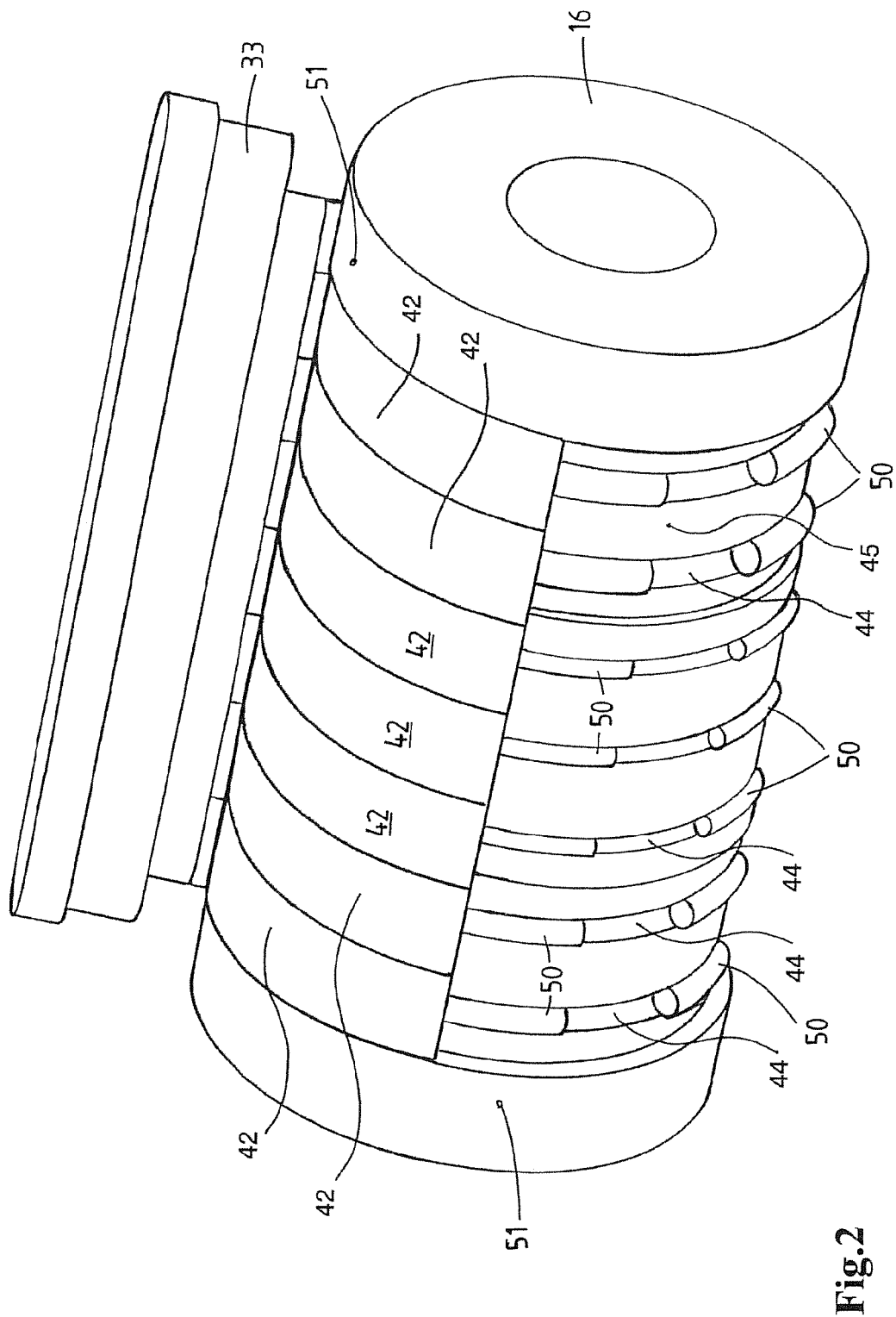
FIG. 2 shows a diagrammatic perspective view of the moulding drum and a part of the mass feed device of the moulding device illustrated in FIG. 1.

The cavities 44 can be distributed over the moulding drum 16 in various ways. As illustrated in FIGS. 2 and 4, the cavities 44 of all of the series may, for example, be arranged in the peripheral surface 45 of the moulding drum 16 in aligned rows parallel to the rotation axis, viewed in the direction of the rotation axis 17. The cavities 44 of adjacent series may, however, also be arranged offset with respect to one another in the peripheral surface 45, viewed in the peripheral direction.

The cavities 44 each define a filling opening 46 in the peripheral surface 45 of the moulding drum 16. The cavities 44 are each closed off at a side opposite the filling opening 46 by a bottom 47 which is integral with the moulding drum 16. In the exemplary embodiment illustrated in FIGS. 2 to 5, the bottom 47 of each cavity 44 has the form of a semicircle in cross section.

As is illustrated most clearly in FIG. 4, the peripheral surface 45 of the moulding drum 16 is provided with a projection 50 between each two successive cavities 44 of each series. Each series of cavities 44 in the peripheral surface of the moulding drum 16 is separated after each cavity 44 in the peripheral direction from a cavity 44 which follows in the peripheral direction by in each case a projection 50; i.e. cavities 44 and projections 50 alternate in the peripheral direction.

The moulding drum is, for example, made of metal, for example metal having a porous structure.

In order to provide the peripheral surface 45 of the moulding drum 16 with the series of cavities 44 and the projections 50 between them, it is possible to first mill the peripheral surface 45 in such a way that continuous ribs are formed around the surface, each of which extends in the peripheral direction. The ribs are substantially parallel to and at a distance from one another, viewed in the direction of the rotation axis. In this case, it is possible for the milled surface to be delimited in the axial direction by two collars 51 which extend in the peripheral direction and are situated opposite one another. Subsequently, the entire porous peripheral surface 45 of the moulding drum 16 is sealed. Sealing of the porous surface of the moulding drum 16 is known per se and will therefore not be explained in more detail. The ribs extending on all sides are then partially milled away, so that the cavities 44 with the projections 50 between them in the peripheral direction are formed. As a result of the latter step, the surfaces of the cavities 44 become porous again, i.e. the bottom 47 and the end faces 48 of each cavity 44 are porous. This is beneficial for removing food products moulded in the cavities 44 by means of blowing air.

The shoe member 24 comprises a filling mouth which is connected to the inlet 32 and ends at the peripheral surface 45 of the moulding drum 16 in such a way that the filling openings of cavities 44 which move past during rotation of the moulding drum 16 come into communication with said filling mouth in order to fill said cavities 44 which move past with the foodstuff.

The shoe member 24 is provided with multiple shoe segments 42 which extend at a distance from one another, viewed in the direction of the rotation axis 17. In this exemplary embodiment, the shoe segments 42 each comprise a single groove 43 extending in the peripheral direction (see FIGS. 3 and 5). Each of the shoe segments 42 sealingly bears against the peripheral surface 45 of the moulding drum 16 with an inner side comprising said single groove 43.

Figure 5:
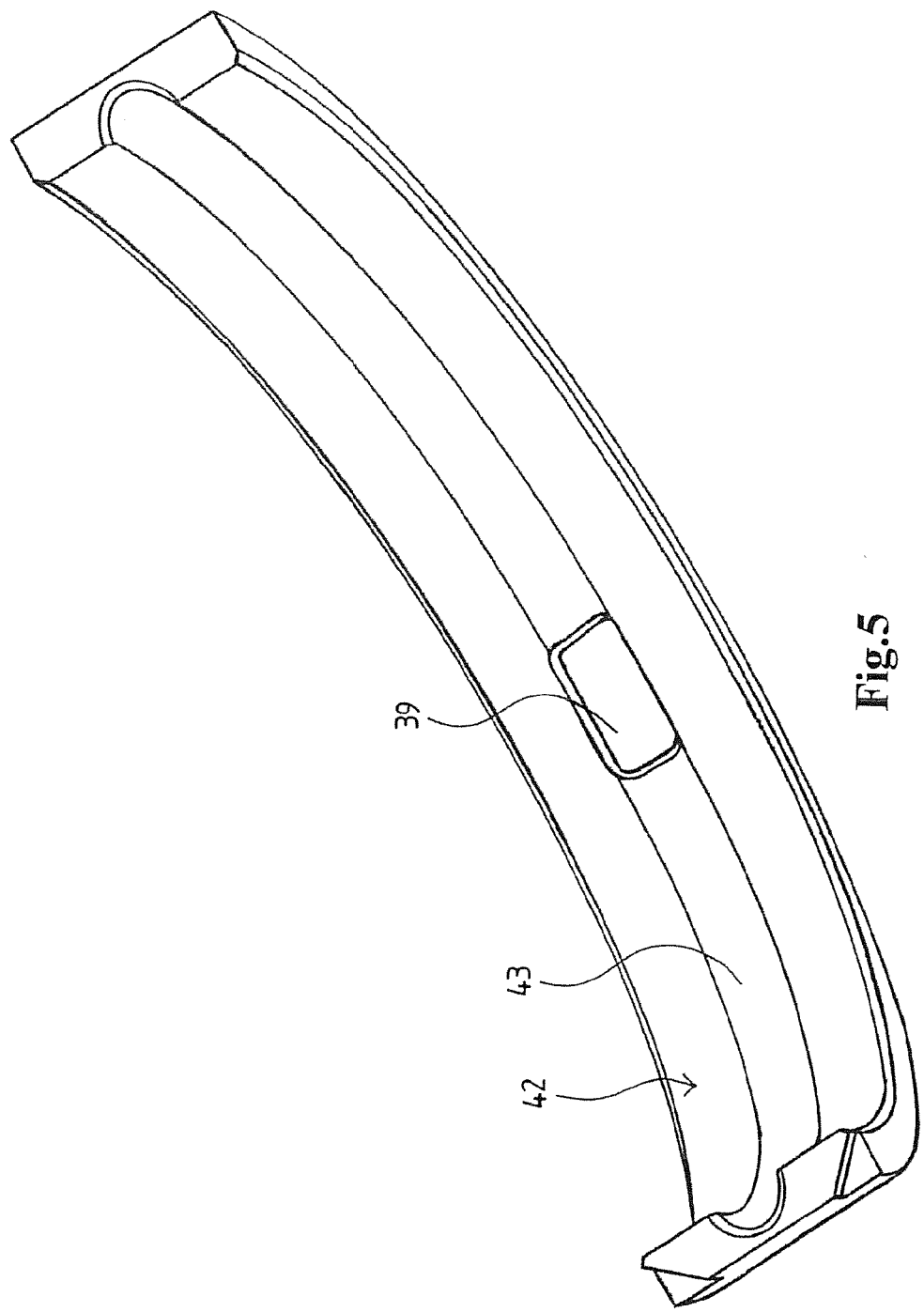
FIG. 5 shows a perspective view of a shoe segment of a shoe member of the mass feed device illustrated in FIGS. 2 and 3, FIG. 6 diagrammatically shows in a cross section at right angles to the rotation axis the construction of the moulding drum and the mass feed device of the moulding device illustrated in FIG. 1, FIG. 7 diagrammatically shows the use of an alignment guide profile for keeping a shoe segment aligned.

Each shoe segment 42 further comprises a passage 39 (see FIG. 5). The passages 39 of the shoe segments 42 form part of the filling mouth of the shoe member.

The projections 50 of the moulding drum 16 come into meshing engagement with the peripherally extending grooves 43 of the respective shoe segments 42 during rotation of the moulding drum 16. In this case, the peripherally extending groove 43 of each shoe segment 42 rests sealingly against the projections 50 of the respective series of the moulding drum 16, which projections 50 move through said groove 43. In addition, the peripherally extending groove 43 of each shoe segment 42, together with each passing cavity 44 of the respective series of the moulding drum 16, in each case forms a moulding cavity for moulding a food product.

In the exemplary embodiment illustrated in FIGS. 2 to 5, the grooves 43 of the shoe segments 42 have a semicircular form in cross section, similar to the bottom 47 of each cavity 44. The grooves 43 adjoin the filling openings 46 of the cavities 44, so that cylindrical and rod-shaped food products are formed, i.e. food products which have a substantially circular cross section. By adapting the shape of the grooves 43 and/or cavities 44, it is possible to change the appearance of the food products.

Figure 3:
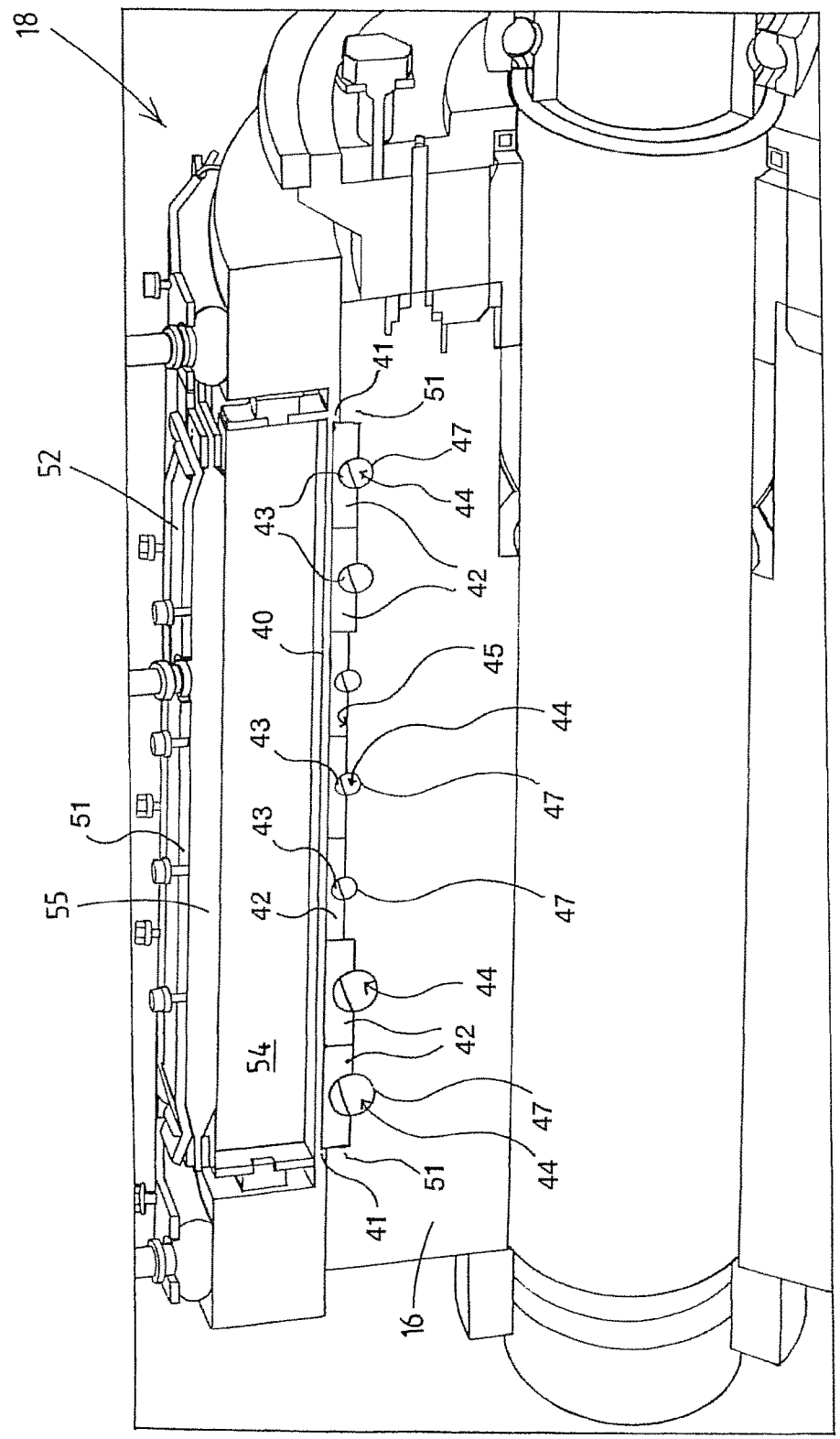
FIG. 3 shows a diagrammatic cross-sectional view of the moulding drum and mass feed device of the moulding device illustrated in FIG. 1.

As is illustrated in FIG. 3, in this case the shoe member 24 also comprises a back plate 40 which extends over the outer side of the shoe segments 42. In FIG. 2 the back plate 40 is omitted.

In this case, the back plate 40, viewed in the direction of the rotation axis 17, is provided at its axial ends with in each case a collar 41 extending in the peripheral direction. In this case, the collars 41 of the back plate 40 are aligned with the collars 51 of the moulding drum 16 (see FIG. 3). Viewed in the direction of the rotation axis 17, the shoe segments 42 are arranged between these aligned collars 41, 51 with play with respect to one another.

In this exemplary embodiment, the shoe segments 42 are formed by individual parts which are arranged separately next to one another and with an open gap between them. The shoe segments 42 have a freedom of movement with respect to one another which is at least sufficient to allow individual alignment movements of each shoe segment in the direction of the rotation axis.

During operation, the shoe segments 42 each remain individually aligned with respect to the shaping profile of the moulding drum 16 formed by the projections 50 and it is ensured that each shoe segment 42 bears sealingly with respect to the projections 50 of the respective series of cavities during rotation of the moulding drum 16.

Keeping the shoe segments 42 aligned can be effected in various different ways.

In this exemplary embodiment, the shoe segments 42 each remain individually aligned by means of the projections 50 which come into meshing engagement with the peripherally extending groove 43 of each shoe segment 42 during rotation of the moulding drum. In the peripheral direction, there are always multiple projections 50 of a series of cavities in the groove 43 of each shoe segment 42, so that the shoe segment 42 is kept aligned by means of the projections 50 themselves.

Figure 7:
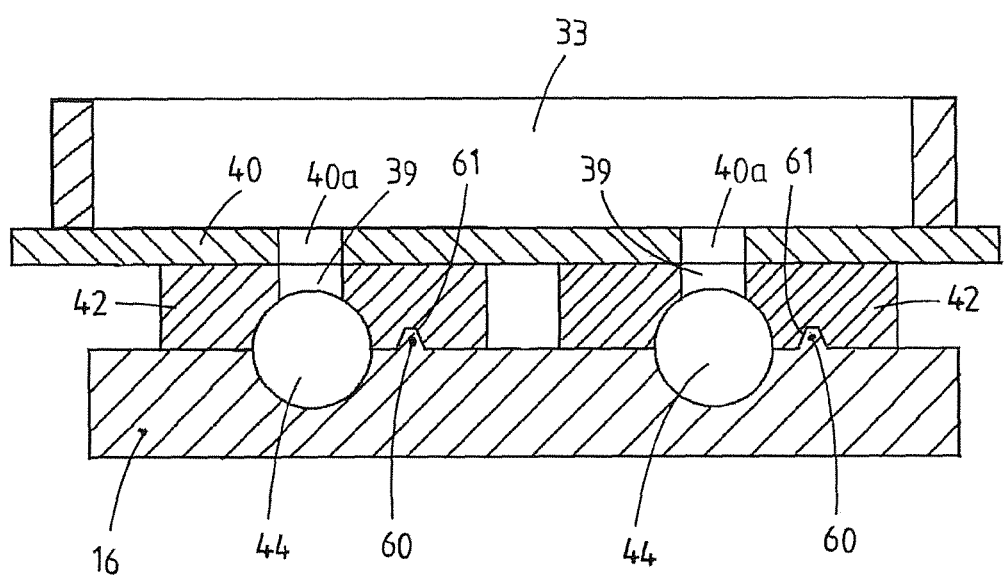

It may be desired to take other measures to keep each of the shoe segments 42 individually aligned with respect to the moulding drum 16. This is illustrated diagrammatically in FIG. 7. In FIG. 7, two sections of the peripheral surface of the moulding drum 16 can be seen, in this example each having one series of cavities 44 and projections 50 as illustrated in FIGS. 2-4. In addition to this shaping profile, formed here in each case by a single series of projections 50, an alignment guide is provided at a distance from the cavities 44 in each section, said alignment guide interacting with the respective shoe segment for the individual alignment thereof.

FIG. 7 diagrammatically illustrates the fact that the profile, in this case the groove 43, of the inner side of each shoe segment 42—viewed in the direction of the rotation axis—is in meshing engagement with the shaping profile of the associated section of the peripheral surface of the moulding drum, in this case with projections 50, with a first tolerance. The alignment guide then interacts—viewed in the direction of the rotation axis—with the shoe segment 42 with a second tolerance which is smaller than the first tolerance, so that it is the alignment guide which determines the alignment and not, or scarcely not, the engagement with the shaping profile.

In FIG. 7 it can be seen that the peripheral surface of the moulding drum is provided with an alignment rib 60 extending in the peripheral direction and the inner side of the shoe segment 42 is provided with one or more alignment grooves 61 in meshing engagement therewith.

The interacting rib 60 and groove 61 of the alignment guide may extend completely around the periphery. It is possible for the rib and groove to also have a sealing function; the alignment guides prevent the foodstuff from being able to leak from one series of cavities 44 into an adjacent series of cavities 44.

An exemplary embodiment will be explained with reference to FIGS. 3 and 6, in which a pressure member is present for keeping the shoe segments 42 pressed against the peripheral surface of the moulding drum 16.

A housing 52 or similar stationary support is illustrated diagrammatically, said housing 52 in this case forming part of the mass feed device 18. The shoe segments 42 and the moulding drum 16 can also be seen, as well as the back plate 40 which is arranged over the outer sides of the shoe segments.

In this case, the pressure member comprises multiple elongate pressure elements arranged at a distance from one another in the peripheral direction, each of which is arranged substantially parallel to the rotation direction of the moulding drum. Here, an elongate intermediate bar or slat 54 and an actuator 55 expandable under fluid pressure and arranged between the housing 52 and the intermediate bar 54 are provided in each case.

In this example, each actuator 55 is embodied as an elongate expandable bellows which in this case is coupled to a source of pressurized gas, for example air, for example in such a way that the pressure in each actuator 55 can be set individually.

The intermediate bars 54 and the back plate 40 distribute the pressing force over the shoe segments 42. The intermediate bar 54 is, for example, a steel bar, such as an I-shaped bar. As a result of the supply of compressed air to the bellows 55, the bellows exerts an adjustable pressure force on the intermediate bar 54. The pressure force is conveyed to the flexible back plate 40 by the intermediate bar 54.

Figure 6:
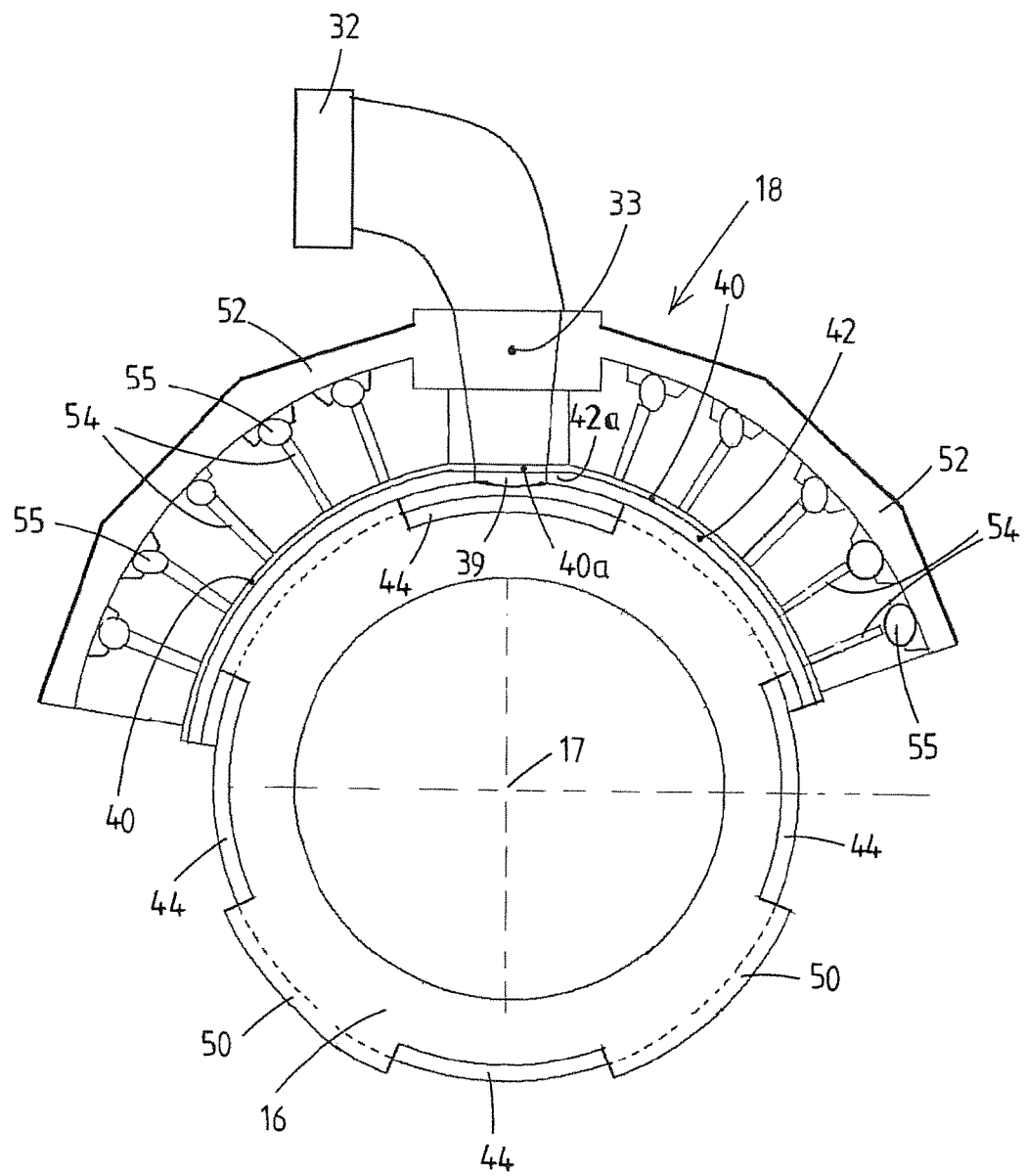

Each of the shoe segments 42 has a flat surface 42a around its passage 39, as can be seen in FIG. 6, while the other parts of each shoe segment are curved. The back plate 40 is correspondingly shaped on the side against which the shoe segments rest, so that there is a form-fit in the peripheral direction which prevents the shoe segments from being carried along by the moulding drum in the rotation direction.

The food products moulded in the moulding cavities are released from the moulding cavities at a release position, in this case at the lowest point of the path of the cavities, for example with the aid of blowing air through porous surface of the cavities 44. The released food products come to rest on the dispensing device 26 which then dispenses the food products.

The dispensing device 26 comprises a conveying device which is arranged underneath the moulding drum 16, for example an endless conveyor belt. The dispensing device 26 is arranged so close to the release position that the food products drop down relatively softly onto the dispensing device 26 when they are released and the moulded profiled outer surface of the released food products remains substantially intact. The products can then, for example, be moved to one or more further processing stations, such as a device to coat the products in egg white, a breadcrumb coating device, an oven, a frying device, a freezing device and/or a packaging device.

Figure 8A:
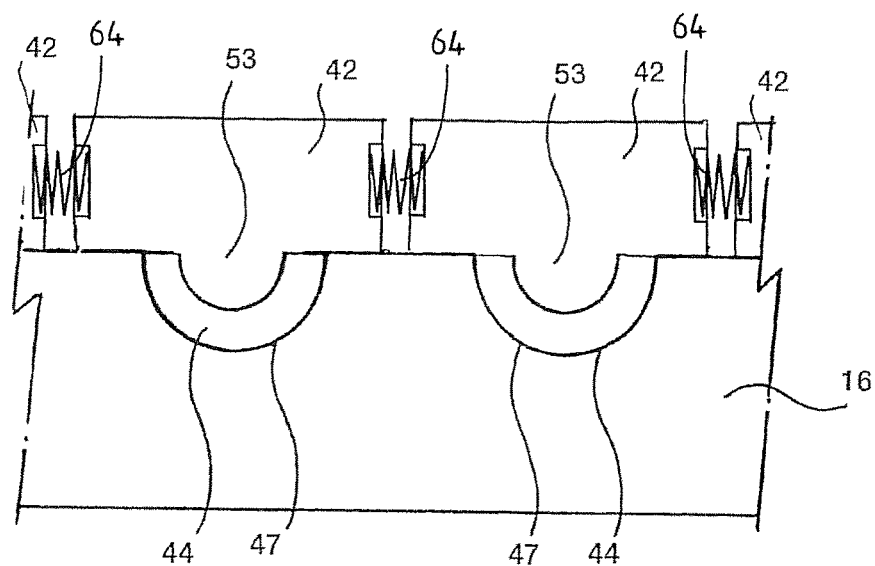
FIG. 8a shows a diagrammatic cross-sectional view of a number of shoe segments and a part of the moulding drum of a second embodiment of a moulding device according to the invention, FIG. 8b diagrammatically shows the moulding drum of FIG. 8a, FIG. 8c diagrammatically shows a moulding drum having a number of shoe segments, wherein the moulding drum has a form which is analogous to FIGS. 8a, b.
Figure 8B:
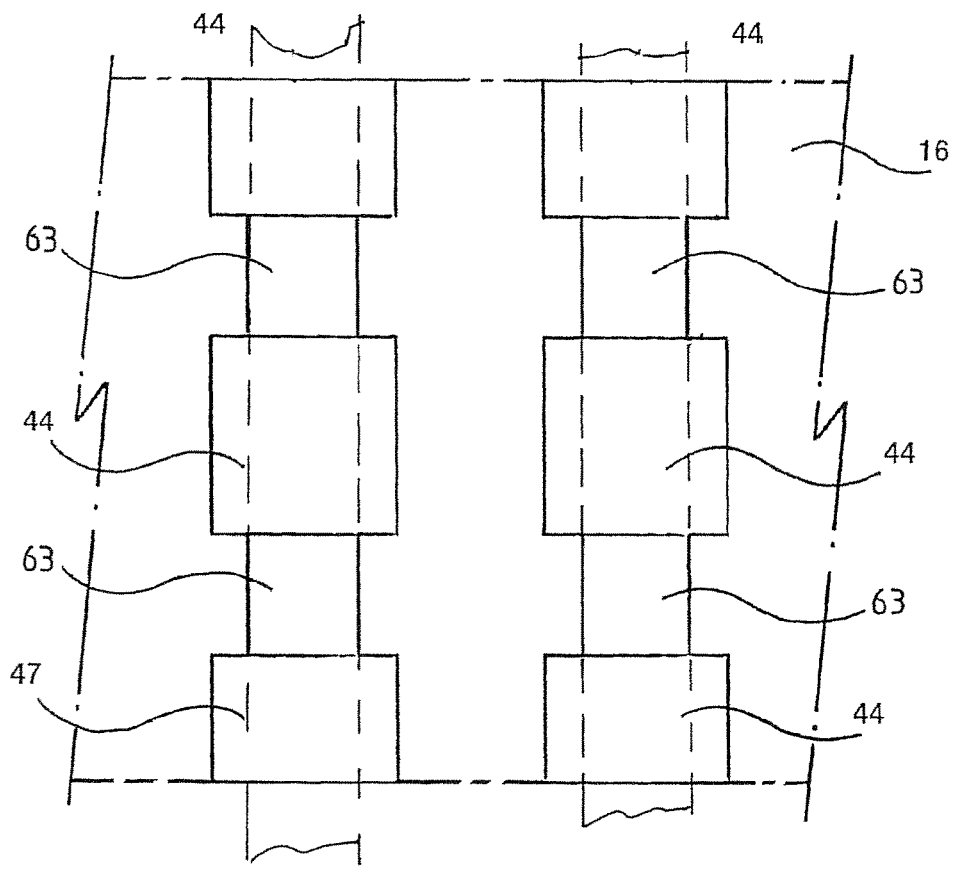

The moulding device according to the invention makes it possible to manufacture food products having different shapes. For example, it is possible to make food products having a C-shaped cross section using the shoe segments 42 and cavities 44 illustrated in FIGS. 8a, 8b and 8c.

In this example, the shoe segments 42 each comprise a rib 53 instead of a groove 43, while the peripheral surface 45 of the moulding drum 16 is provided with recesses 63 between the cavities 44 of each series, instead of projections 50, so that a groove extending around the periphery is present in the moulding drum and intersects the cavities. The cross section of the recesses 63 corresponds to that of the rib 53, so that moulding cavities having a C-shaped cross section are provided separated from one another and are successively filled with foodstuff via a passage in the shoe segment.

It will be clear that a shoe segment 42 can also be provided with multiple parallel ribs 53 instead of one single rib 53, with the moulding drum 16 being provided with multiple recesses 63 extending in the peripheral direction between each pair of successive cavities 44.

It will also be clear that the moulding cavities 44 can have an entirely different shape, for example with a cross-sectional form which varies, viewed in the peripheral direction of the moulding drum, from one end of a cavity 44 to the other end.

FIG. 8 also illustrates the possibility of providing one or more flexible connections between adjacent shoe segments, for example with springs 64, which connections bridge the gap between the shoe segments. The springs 64 are embodied in such a way that they promote the alignment of the shoe segments.

Figure 9:
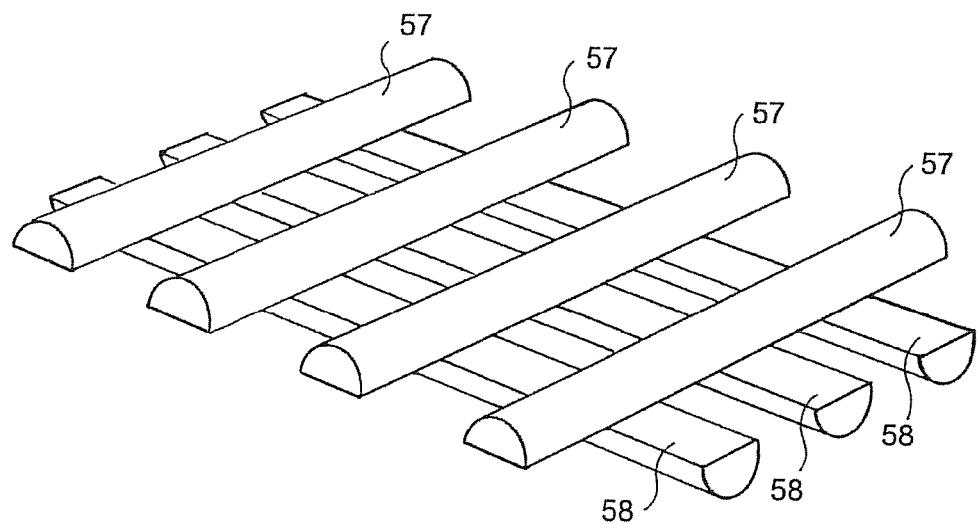
FIG. 9 shows a perspective view of a food product which is moulded using a third embodiment of the moulding device according to the invention.

It is also possible, for example, to mould the food product illustrated in FIG. 9. In this case, a group of cavities, in this case three cavities, is present in the peripheral surface of the moulding drum, in order to mould the lower three strips 58 of the food product. These cavities are each elongate, for example. In this example, the cavities extend substantially parallel to the rotation axis 17 of the moulding drum, but a different direction which in any case is at an angle with respect to the peripheral direction of the moulding drum is also conceivable. There is no projection 50 between the cavities of this group of cavities in the moulding drum, but the peripheral surface 45 is in one plane with the filling openings of cavities. Each shoe segment 42 has one or more, in this case four, peripheral grooves, while one or multiple projections 50, in this case four next to one another, are provided on the peripheral surface 45 of the moulding drum 16 between the groups of cavities, said projections 50 corresponding to the four grooves of each shoe segment 42. By means of said grooves and projections the four upper strips 57 of the food product are formed, which intersect the lower strips 58 and form an integral whole therewith at the points of intersection. In this way it is possible, for example, to mould a grid-shaped product.

In a variant, the group of cavities which form the strips 58 could be replaced, for example, by a loop-shaped cavity, for example in the form of a circular loop, with one or more strips 57 being formed on top of the loop-shaped underside of the product, which strips 57 intersect the loop and are integral therewith at each intersection point.

Figure 10A:
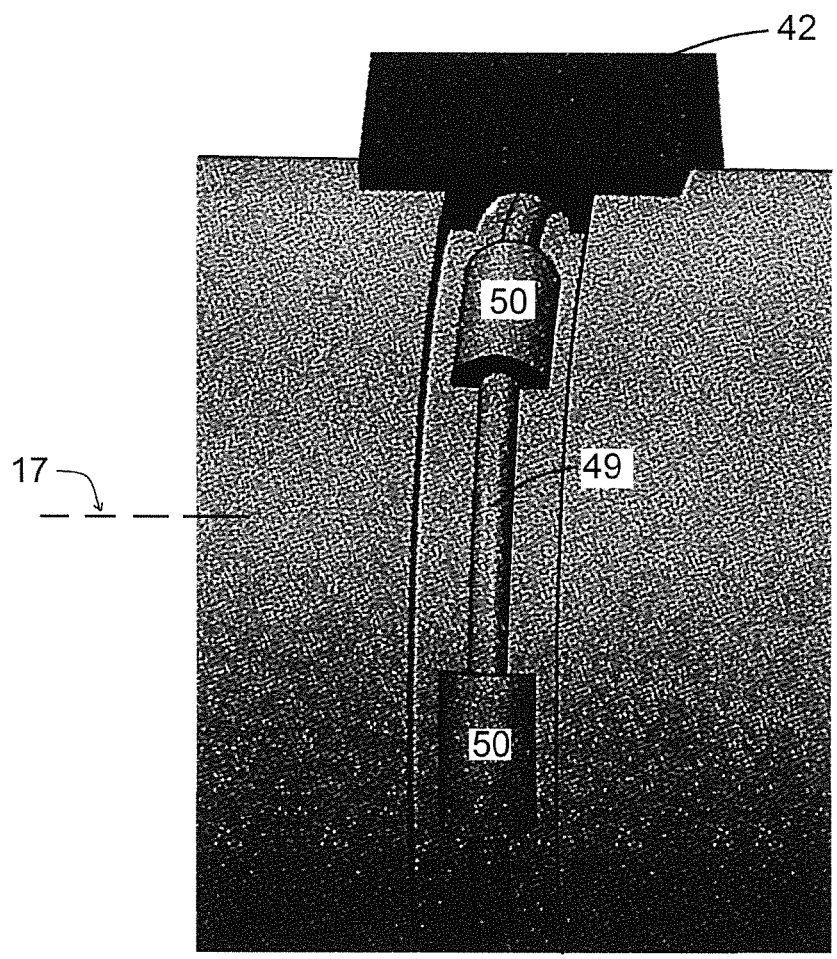
FIG. 10a shows a perspective view of a part of a moulding drum and associated shoe segment of an exemplary embodiment according to the invention, FIG. 10b diagrammatically shows a cross section of the moulding drum and shoe segment of FIG. 10a, FIG. 10c diagrammatically shows a cross section of a variant of the moulding drum and shoe segment according to FIGS. 10a and 10b, FIG. 11 diagrammatically shows a fourth moulding device according to the invention in a cross section at right angles to the rotation axis of the tubular moulding drum, FIG. 12 diagrammatically shows a longitudinal cross section of a part of the moulding drum, base member, and mass feed device of the moulding device of FIG. 11.

FIGS. 10*a* and *b* illustrate an embodiment of the invention in which the peripheral surface of the moulding drum 16 is embodied as a profiled peripheral surface having a shaping profile which comprises multiple series of projections 50 (only one is shown in FIGS. 10*a* and *b*) extending in the peripheral direction. The projections 50 in a series are spaced apart in the peripheral direction. The series of projections 50 are substantially parallel to and at a distance from one another, viewed in the direction of the rotation axis of the moulding drum 16, as can be seen for example in FIG. 10*c*.

FIGS. 10 *a* and *b* illustrate a shoe segment 42, multiple of which are arranged next to one another in the direction of the rotation axis in the shoe member which is not shown in any greater detail.

The shoe segment 42 has an inner side which is adjacent to an associated section of the peripheral surface of the moulding drum 16, which section in this case has a single series of projections 50.

The inner side of the shoe segment 42 is embodied as a profiled inner side having a profile which comprises a groove extending in the peripheral direction, in this case one single groove, for the series of projections 50. This groove, here with a semicircular form, is in engagement with the shaping profile of the section of the moulding drum.

The shoe segment 42 has a passage 39 which forms part of the filling mouth of the mass feed device not shown here in any more detail and which ends at the inner side of the shoe segment 42.

In the bottom illustration of FIG. 10*b*, the cross section, shown in a plane through the rotation axis of the moulding drum, is at the location of the passage 39 of segment 42 and at the moment when this passage is situated in the area between two projections 50. As a result, the end face of one projection 50 can be seen.

The top illustration of FIG. 10*b* represents the same cross section shown at another location of the segment 42 where the groove 43 of this segment 42 fits onto the projection 50 and thus bears against it sealingly.

A space is formed between two successive projections 50, said space coming into contact in each case with the passage 39 of the shoe segment 42 during rotation of the moulding drum and then being filled with the food product. It can be seen that the profiled section of the moulding drum actually only forms one side of the product, which could be called the base side, and that the shoe segment 42 forms the rest of the contour of the product, in other words the sides and the top.

In this example, it can be seen that the moulding drum 16 is embodied with an outwardly protruding relief in the area between two successive projections 50 of a series, this relief having a smaller cross section than the projections 50 and therefore not protruding beyond the contour of the projections 50 which interact with the profile of the shoe segment 42.

In this example, one single rib 49 is provided between two projections 50, in this case having a cross section which is uniform over its length (viewed in the peripheral direction). The rib 49 could also have a variable cross section over its length and possibly even be combined with one or more other ribs. The rib 49 does not have to be straight either, for example an undulating form is also possible. The rib 49 also does not have to adjoin the end faces of the projections 50. The rib 49 may also end at a distance therefrom and therefore form a bump which causes an elongate dent in this side of the moulded product. Of course, it is also possible to provide the relevant area with an entirely different relief, for example with multiple bumps.

As already explained above, in the embodiment according to FIGS. 10*a* and *b* the shoe segments 42 have freedom of movement with respect to one another at least in the direction of the rotation axis of the moulding drum 16 in order to each remain individually aligned with respect to the profile of the section with which the inner side of the shoe segment 42 is in engagement.

Figure 10C:
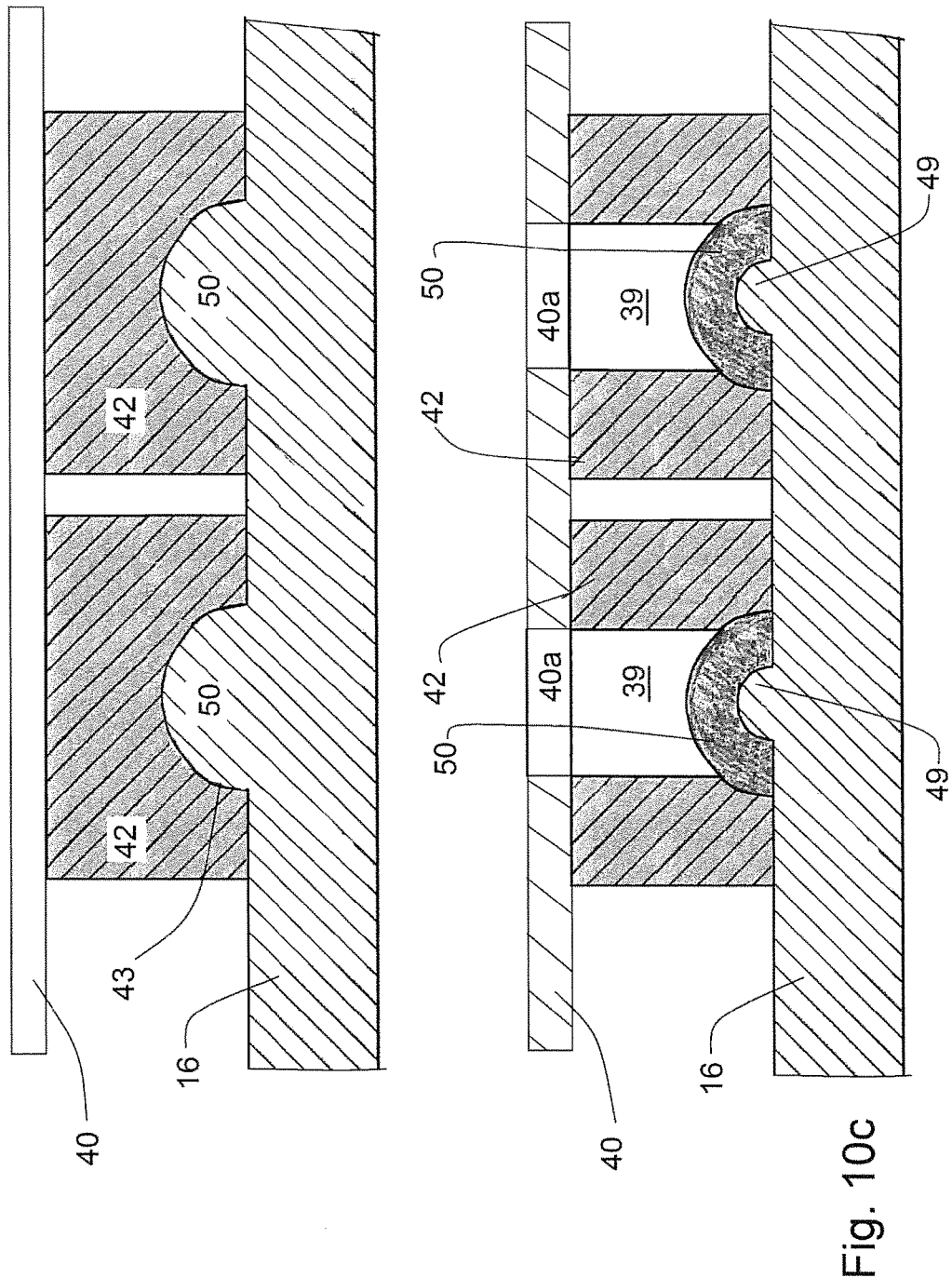

FIG. 10*c* shows a variant of FIGS. 10*a* and *b*. In this case, the projections 50 are not (partially) recessed in the moulding drum 16, but protrude in their entirety beyond the cylindrical peripheral surface of the moulding drum 16. The back plate 40 comprising mouths 40*a* is also shown in the bottom illustration which shows a cross section in a plane through the rotation axis of the moulding drum 16.

It will be clear to the person skilled in the art that a moulding drum can be provided with a series of projections 50, with a cavity 44 being provided between some of the pairs of projections in a series and an outwardly protruding relief, for example with one or more ribs 49, being provided between other pairs of projections in the same series. In this way, it is possible to produce a wide variety of products, for example pieces of meat having different shapes for soups.

Another embodiment of a moulding device according to the invention will now be explained with reference to FIGS. 11 and 12.

The figures show a moulding device 80 for moulding three-dimensional food products 81 from a mass of foodstuff which can be transferred by pumping, for example a meat mass of minced meat.

The device 80 comprises:
 a frame 82,
 a moulding drum 83 which is connected to the frame 82 so as to be drivable and rotatable about a rotation axis 82*a*,
 a mass feed device 84 which is arranged in a filling position with respect to the peripheral surface of the moulding drum 83.

The mass feed device 84 is provided with:
- an inlet 85 which can be connected to a pump for supplying the foodstuff,
- a shoe member 86 which is adjacent to the peripheral surface of the moulding drum 83, wherein the shoe member comprises a filling mouth 87 which is connected to the inlet 85 and ends at the peripheral surface of the moulding drum in such a way that the filling openings of cavities 88 which move past during rotation of the moulding drum 83 come into communication with said filling mouth in order to fill said passing cavities 88 with the foodstuff.

The moulding drum 83 is tubular and has an outer and an inner peripheral surface 83$a$, 83$b$. In this example, the shoe member 86 is adjacent to the outer peripheral surface. The cavities 88 are each formed as a through-opening in the tubular moulding drum.

In the peripheral surface, the moulding drum has multiple series of cavities 88 extending in the peripheral direction, with these series extending substantially parallel to and at a distance from one another, viewed in the direction of the rotation axis. The cavities 88 in each series of multiple cavities 88 are at a distance from one another, viewed in the peripheral direction of the peripheral surface of the moulding drum, and the cavities each define a filling opening on the peripheral surface of the moulding drum.

The moulding device 80 also has a base member 90 which is arranged in the tubular moulding drum 83 so as to be stationary with respect to the frame and opposite the shoe member 86. This base member 90 adjoins the inner peripheral surface 83$b$ of the moulding drum 83, so that the cavities are each closed off by a base which is formed by the base member 90 on the side opposite the filling opening.

Figure 11:
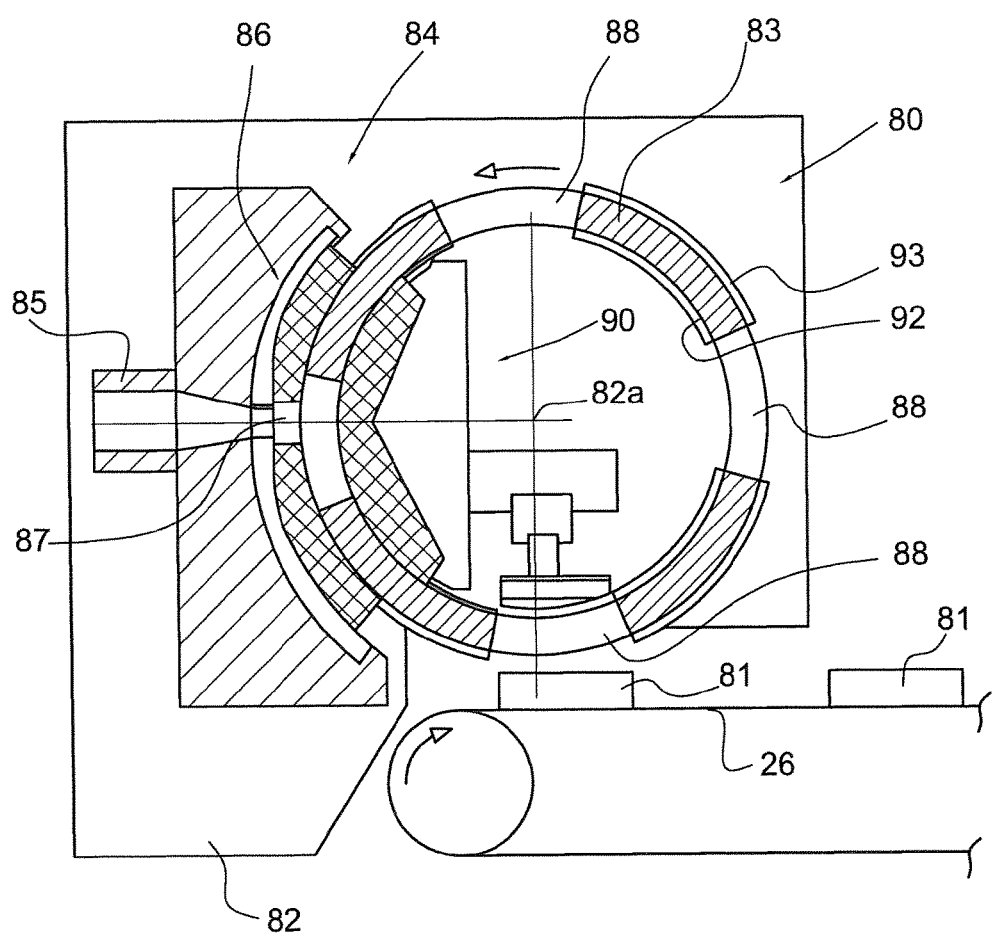
Figure 12:
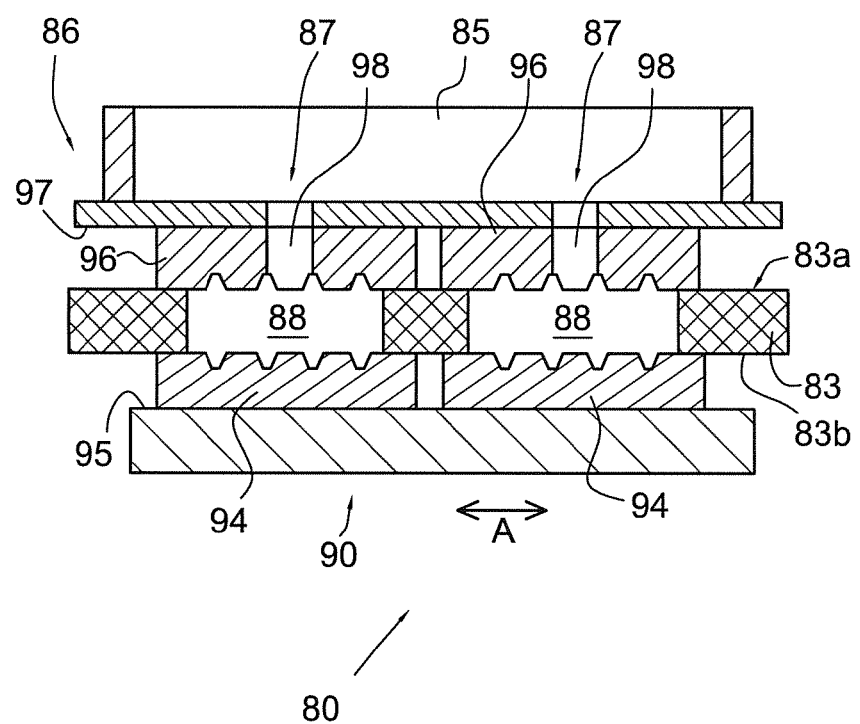

FIGS. 11 and 12 illustrate that the inner peripheral surface 83$b$ of the moulding drum 83 is embodied as a profiled peripheral surface having a shaping profile which comprises, for each series of cavities 88, projections between multiple pairs of successive cavities of this series and/or one or more peripheral grooves extending in the peripheral direction between and through the successive cavities of this series. In this case, a group of adjacent rib-shaped projections 92 is provided in order to form a ribbed pattern on the base side of the product.

FIGS. 11 and 12 also illustrate that the outer peripheral surface of the moulding drum 83 is embodied as a profiled peripheral surface having a shaping profile which comprises, for each series of cavities 88, projections between multiple pairs of successive cavities of this series and/or one or more peripheral grooves extending in the peripheral direction between and through the successive cavities of this series. In this case, a group of adjacent rib-shaped projections 93 is provided in order to form a ribbed pattern on the filling side of the product.

FIGS. 11 and 12 illustrate that the base member 90 is provided with multiple shoe segments 94 which are arranged next to one another, viewed in the direction of the rotation axis. In this case, each shoe segment 94 has an inner side which is adjacent to an associated section of the inner peripheral surface of the moulding drum 83. The inner side of each shoe segment 94 is embodied as a profiled inner side having a profile which comprises, for each series of cavities 88, one or more grooves extending in the peripheral direction and/or ribs extending in the peripheral direction, which grooves and/or ribs are in meshing engagement with the shaping profile of this section.

The shoe segments 94 are accommodated in the base member 90, for example with the outer side thereof resting against a sliding surface 95 of the base member, in such a way that the shoe segments 94 of the base member have freedom of movement with respect to one another, at least in the direction of the rotation axis A, in order to each remain individually aligned with respect to the profile of the section with which the inner side of the shoe segment is in meshing engagement.

FIGS. 11 and 12 illustrate that the shoe member 86 is provided with multiple shoe segments 96 which are arranged next to one another, viewed in the direction of the rotation axis. In this case, each shoe segment 96 has an inner side which adjoins an associated section of the outer peripheral surface of the moulding drum 83. The inner side of each shoe segment 96 is embodied as a profiled inner side having a profile which comprises, for each series of cavities 88, one or more grooves extending in the peripheral direction and/or ribs extending in the peripheral direction, which grooves and/or ribs are in meshing engagement with the shaping profile of this section.

The shoe segments 96 are accommodated in the shoe member 86, for example with the outer side thereof resting against a sliding surface 97, in such a way that the shoe segments 96 have freedom of movement with respect to one another, at least in the direction of the rotation axis A, in order to each remain individually aligned with respect to the profile of the section with which the inner side of the shoe segment 96 is in meshing engagement.

As the shoe segments 96 are located at the filling side, each shoe segment 96 is provided with a passage 98 which forms part of the filling mouth of the mass feed device.

It will be clear that the shoe segments 94, 96 offer the same advantages as those explained in relation to the device having a moulding drum which forms the bottom of the cavities itself. Details of the shoe segments which are discussed here in relation to the shoe member of the mass feed device may also be used in the base member provided with shoe segments.

FIG. 12 may also be used to illustrate that the invention can be used in a so-called plate moulding device. In other words, the diagrammatic illustration is also representative of a moulding plate device according to the invention, with the same reference numerals being used in the description which follows.

A moulding device of this type which is generally known per se comprises a frame, a moulding plate 83 and a moulding plate drive, with the moulding plate 83 having a length (in a direction at right angles to the plane of the drawing) and a width (in the plane of the drawing). The moulding plate is connected to the frame so as to be movably drivable to and fro in the longitudinal direction, with the moulding plate having a first outer surface 83$a$ and a second outer surface 83$b$ situated opposite.

Viewed in the direction of the width of the moulding plate 83, cavities 88 are present in the moulding plate, for example one single series of cavities or two parallel series of cavities 88 in the moulding plate. The cavities 88 in a series are at a distance from one another, viewed in this direction. Each cavity 88 is embodied as a through-opening in the moulding plate between the first and second outer surfaces. The cavities 88 each define a filling opening on the first outer surface of the moulding plate 83.

In a filling position, the frame which is not illustrated holds a mass feed device which is provided with an inlet which can be connected to a pump for supplying the foodstuff. This device further comprises a shoe member 86 which adjoins the first outer surface 83$a$ of the moulding plate 83. The shoe member 86 comprises a filling mouth 87 which is connected to the inlet and which ends at the first outer surface of the moulding plate in such a way that the filling openings of cavities 88 which move past during the to and fro movement of the moulding plate 83 come into communication with this filling mouth in order to fill these cavities 88 which move past with the foodstuff.

The plate moulding device furthermore has a base member 90 which is arranged so as to be stationary with respect to the frame and opposite the shoe member 86. The base member adjoins the second outer surface 83*b* of the moulding plate 83, so that the cavities 88 are each closed off by a bottom at the side opposite the filling opening.

It can be seen that the first outer surface 83*a* of the moulding plate 83 is embodied as a profiled outer surface having a shaping profile which comprises, for each cavity 88, one or more projections extending in the longitudinal direction of the moulding plate and/or one or more grooves extending in the longitudinal direction of the moulding plate and through the cavity.

The shoe member 86 is provided with multiple shoe segments 96 which are arranged next to one another, viewed in the direction of the width of the moulding plate 83.

Each shoe segment 96 has an inner side which adjoins an associated section of the first outer surface of the moulding plate 83, which section comprises a series of one or more cavities 88, with the inner side of each shoe segment being embodied as a profiled inner side having a profile which comprises, for each series of cavities, one or more grooves extending in the longitudinal direction of the moulding plate 83 and/or ribs extending in the longitudinal direction of the moulding plate, which grooves and/or ribs are in meshing engagement with the shaping profile of this section.

The shoe segments 96 of the shoe member 86 have freedom of movement with respect to one another, at least in the direction of the width of the moulding plate, in order to each remain individually aligned with respect to the profile of the section with which the inner side of the shoe segment is in engagement.

It can be seen that the second outer surface 83*b* of the moulding plate 83 is embodied as a profiled outer surface having a shaping profile which comprises, for each cavity 88, one or more projections extending in the longitudinal direction, and thus the movement direction, of the moulding plate 83 and/or one or more grooves extending in the longitudinal direction of the moulding plate and through the cavity. In this case, as already mentioned, rib-shaped projections are provided in order to create a ribbed pattern on the base side of the product during moulding.

The base member is provided with multiple shoe segments 94 which are arranged next to one another, viewed in the direction of the width of the moulding plate 83.

Each shoe segment 94 of the base member has an inner side which adjoins an associated section of the second outer surface 83*b* of the moulding plate, which section comprises a series of one or optionally multiple cavities 88, wherein the inner side of each shoe segment 94 is embodied as a profiled inner side having a profile which comprises, for each series of cavities 88, one or more grooves extending in the longitudinal direction of the moulding plate and/or ribs extending in the longitudinal direction of the moulding plate, which grooves and/or ribs are in meshing engagement with the shaping profile of this section.

As already discussed, the shoe segments 94 of the base member 90 have freedom of movement with respect to one another, at least in the direction of the width of the moulding plate, in order to each remain individually aligned with respect to the profile of the section with which the inner side of the shoe segment 94 is in meshing engagement.

One or more of the properties mentioned in the above description can be combined each individually or in any conceivable combination. One or more of the properties mentioned in the above description can also be combined with one or more of the properties according to one or more of the claims, each individually or in any conceivable combination.

The invention claimed is:

1. A moulding device for moulding three-dimensional food products from a mass of foodstuff which can be transferred by pumping, said device comprising:
   a frame,
   a moulding drum which is connected to the frame so as to be drivable and rotatable about a rotation axis, wherein the moulding drum has a peripheral surface with multiple series of cavities, wherein said series extend substantially parallel to and at a distance from one another, viewed in the direction of the rotation axis, and wherein each series comprises multiple cavities which are at a distance from one another, viewed in peripheral direction of the peripheral surface of the moulding drum, and wherein the cavities each define a filling opening in the peripheral surface of the moulding drum,
wherein the cavities are each closed at a side opposite the filling opening by a bottom,
   a mass feed device which is arranged in a filling position with respect to the peripheral surface of the moulding drum, wherein the mass feed device is provided with:
   an inlet for feeding a mass of foodstuff by means of a pump into the mass feed device,
   a shoe member which adjoins the peripheral surface of the moulding drum, wherein the shoe member comprises a filling mouth which is connected to the inlet and ends at the peripheral surface of the moulding drum in such a way that the filling openings of cavities which move past during rotation of the moulding drum come into communication with said filling mouth in order to fill said cavities with the mass of foodstuff as the cavities move past,
wherein the peripheral surface of the moulding drum is embodied as a profiled peripheral surface having a shaping profile which, for each series of cavities, comprises at least one of projections between multiple pairs of successive cavities of said series and of one or more peripheral grooves which extend in the peripheral direction between and through successive cavities of said series,
and wherein the shoe member is provided with multiple shoe segments which are arranged next to one another, viewed in the direction of the rotation axis,
and wherein each shoe segment has an inner side which adjoins an associated section of the peripheral surface of the moulding drum, which section comprises one or more series of cavities, wherein the inner side of each shoe segment is embodied as a profiled inner side having a profile which, for each series of cavities, comprises at least one of one or more grooves extending in the peripheral direction and of one or more ribs extending in the peripheral direction, which at least one of one or more grooves and of one or more ribs are in meshing engagement with the shaping profile of said section,
and wherein each shoe segment comprises at least one passage which forms part of the filling mouth and which ends at the inner side of the shoe segment, so that, during rotation of the moulding drum, repeatedly a moulding cavity for moulding a food product, which moulding cavity comes into contact with a passage of the shoe segment, is delimited by the moulding drum and the shoe segment, and wherein the shoe segments have a freedom of movement with respect to one another, at least in the direction of the rotation axis, in order to each remain individually aligned with respect to the profile of the section with which the inner side of the shoe segment is in meshing engagement.

2. A moulding device according to claim 1, wherein the shaping profile of the section with which the inner side of the shoe segment is in meshing engagement provides the individual alignment of the shoe segment.

3. A moulding device according to claim 1, wherein the section of the peripheral surface of the moulding drum comprises an alignment guide next to the shaping profile and at a distance from the cavities in said section, which alignment guide interacts with the respective shoe segment for the individual alignment thereof.

4. A moulding device according to claim 3, wherein the profile of the inner side of each shoe segment viewed in the direction of the rotation axis, is in meshing engagement with the shaping profile of the associated section of the peripheral surface of the moulding drum with a first tolerance, and wherein the alignment guide, viewed in the direction of the rotation axis, interacts with the shoe segment with a second tolerance which is less than the first tolerance.

5. A moulding device according to claim 4, wherein one of the sections of the peripheral surface and of the inner side of the shoe segment is provided with an alignment groove extending in the peripheral direction and the other of the sections of the peripheral surface and of the inner side of the shoe segment is provided with one or more alignment projections in meshing engagement therewith.

6. A moulding device according to claim 1, wherein the shoe segments each have an outer side, and wherein the shoe member is provided with a back plate which extends over the outer sides of multiple shoe segments so that the shoe segments are arranged between the back plate and the moulding drum, and wherein the back plate comprises passages for the mass of foodstuff which are connected to the passages of the shoe segments.

7. A moulding device according to claim 6, wherein the back plate, viewed in the direction of the rotation axis, is provided at its ends with a collar extending in the peripheral direction and protruding towards the moulding drum, and wherein the peripheral surface of the moulding drum is provided with a collar opposite each of said collars of the back plate, said collar on the moulding drum extending in the peripheral direction and protruding towards the back plate, wherein the shoe segments are arranged next to one another between collars of the back plate and the collars of the peripheral surface of the moulding drum which lie opposite one another.

8. A moulding device according to claim 1, wherein an open gap is present between adjacent shoe segments so that each shoe segment has an individual freedom of movement in order to remain individually aligned with respect to the profile of the section with which the inner side of the shoe segment is in meshing engagement.

9. A moulding device according to claim 1, wherein the shoe segments are each forming as a separate part.

10. A moulding device according to claim 1, wherein shoe segments are connected to one another by means of flexible connecting parts.

11. A moulding device according to claim 1, wherein the mass feed device comprises a pressure member that keeps the shoe segments of the shoe member pressed against the peripheral surface of the moulding drum.

12. A moulding device according to claim 11, wherein said pressure member is provided with one or multiple elongate pressure elements situated at a distance from one another in the peripheral direction, each of which pressure elements is arranged substantially parallel to the rotation axis of the moulding drum and each of which exerts a pressing force on multiple shoe segments.

13. A moulding device according to claim 12, wherein each elongate pressure element comprises an elongate intermediate bar which is arranged substantially parallel to the rotation axis of the moulding drum, wherein an actuator which is expandable under fluid pressure is arranged between a housing of the shoe member and the intermediate bar, wherein the expandable actuator engages with the intermediate bar in order to exert a pressure force on the shoe members via the intermediate bar.

14. A moulding device according to claim 1, wherein the peripheral surface of the moulding drum is made of metal, and wherein at least the inner side of the shoe segments is made of plastic.

15. A moulding device according to claim 1, wherein the moulding drum is embodied in such a way that the cavities are each closed off at the side opposite the filling opening by a base forming said bottom, which base forms part of the moulding drum.

16. A moulding device according to claim 1, wherein the moulding drum is tubular and comprises an outer peripheral surface and an inner peripheral surface, wherein the shoe member adjoins one of said peripheral surfaces, and wherein the cavities are each formed by a through-opening in the tubular moulding drum, and wherein the moulding device has a base member which is arranged stationary with respect to the frame and opposite the shoe member, which base member adjoins the other of said peripheral surfaces of the tubular moulding drum, so that the cavities are each closed off at the side opposite the filling opening by a bottom.

17. A moulding device according to claim 16, wherein the peripheral surface of the tubular moulding drum which adjoins the base member is embodied as a profiled peripheral surface having a shaping profile which comprises, for each series of cavities, at least one of projections between multiple pairs of successive cavities of said series and of one or more peripheral grooves which extend in the peripheral direction between and through the successive cavities of said series, and wherein the base member is provided with multiple shoe segments which are arranged next to one another, viewed in the direction of the rotation axis, and wherein each shoe segment of the base member has an inner side which adjoins an associated section of the peripheral surface of the moulding drum, which section comprises one or more series of cavities, wherein the inner side of each shoe segment is embodied as a profiled inner side having a profile which, for each series of cavities, comprises at least one of one or more grooves extending in the peripheral direction and of one or more ribs extending in the peripheral direction, which at least one of one or more grooves and of one or more ribs are in meshing engagement with the shaping profile of said section, and wherein the shoe segments of the base member have a freedom of movement with respect to one another, at least in the direction of the rotation axis, in order to each remain individually aligned with respect to the profile of the section with which the inner side of the shoe segment is in meshing engagement.

18. A moulding device for moulding three-dimensional food products from a mass of foodstuff which can be transferred by pumping comprising:
a frame,
a moulding drum which is connected to the frame so as to be drivable and rotatable about a rotation axis, wherein the moulding drum has a peripheral surface,
a mass feed device which is arranged in a filling position with respect to the peripheral surface of the moulding drum, wherein the mass feed device is provided with:
an inlet for feeding a mass of foodstuff by means of a pump into the mass feed device,
a shoe member which adjoins the peripheral surface of the moulding drum, wherein the shoe member comprises a filling mouth which is connected to the inlet and ends at the peripheral surface of the moulding drum,
wherein the peripheral surface of the moulding drum is embodied as a profiled peripheral surface having a shaping profile which comprises multiple series of projections extending in peripheral direction, which projections in a series are at a distance from one another in the peripheral direction, and wherein the series extend substantially parallel to and at a distance from one another, viewed in the direction of the rotation axis,
and wherein the shoe member is provided with multiple shoe segments which are arranged next to one another, viewed in the direction of the rotation axis,
and wherein each shoe segment has an inner side which adjoins an associated section of the peripheral surface of the moulding drum, which section comprises one or more series of projections, wherein the inner side of each shoe segment is embodied as a profiled inner side having a profile which, for each series of projections, comprises one or more grooves extending in the peripheral direction, which grooves are in meshing engagement with the shaping profile of said section,
and wherein each shoe segment comprises at least one passage which forms part of the filling mouth and which ends at the inner side of the shoe segment, so that, during rotation of the moulding drum, repeatedly a space for moulding a food product, which space comes into contact with a passage of the shoe segment, is delimited by the moulding drum and the shoe segment,
and wherein the shoe segments have a freedom of movement with respect to one another, at least in the direction of the rotation axis, in order to each remain individually aligned with respect to the profile of the section with which the inner side of the shoe segment is in meshing engagement.

19. A moulding device for moulding three-dimensional food products from a mass of foodstuff which can be transferred by pumping, comprising:
a frame,
a moulding drum which is connected to the frame so as to be drivable and rotatable about a rotation axis, wherein the moulding drum has a peripheral surface containing multiple series of cavities, wherein said series extend substantially parallel to and at a distance from one another, viewed in the direction of the rotation axis, and wherein each series comprises multiple cavities which are at a distance from one another, viewed in peripheral direction of the peripheral surface of the moulding drum, and wherein the cavities each define a filling opening in the peripheral surface of the moulding drum,
a mass feed device which is arranged in a filling position with respect to the peripheral surface of the moulding drum, wherein the mass feed device is provided with:
an inlet for feeding a mass of foodstuff by means of a pump into the mass feed device,
a shoe member which adjoins the peripheral surface of the moulding drum, wherein the shoe member comprises a filling mouth which is connected to the inlet and ends at the peripheral surface of the moulding drum in such a way that the filling openings of cavities which move past during rotation of the moulding drum come into communication with said filling mouth in order to fill said cavities with the foodstuff as they move past,
wherein the moulding drum is tubular and comprises an outer peripheral surface and an inner peripheral surface, wherein the shoe member adjoins one of said peripheral surfaces, and wherein the cavities are each formed by a through-opening in the tubular moulding drum, and wherein the moulding device has a base member which is arranged stationary with respect to the frame and opposite the shoe member, which base member adjoins the other peripheral surface of the tubular moulding drum, so that the cavities are each closed off at the side opposite the filling opening by a bottom,
wherein the peripheral surface at the base of the tubular moulding drum is embodied as a profiled peripheral surface having a shaping profile which comprises, for each series of cavities, comprises at least one of projections between multiple pairs of successive cavities of said series and of one or more peripheral grooves which extend in the peripheral direction between and through the successive cavities of said series,
and wherein the base member is provided with multiple shoe segments which are arranged next to one another, viewed in the direction of the rotation axis,
and wherein each shoe segment of the base member has an inner side adjoins an associated section of the relevant peripheral surface of the moulding drum, which section comprises one or more series of cavities, wherein the inner side of each shoe segment is embodied as a profiled inner side having a profile which comprises, for each series of cavities, one or more grooves extending in the peripheral direction and/or ribs extending in the peripheral direction, which grooves and/or ribs are in meshing engagement with the shaping profile of said section,
and wherein the shoe segments of the base member have a freedom of movement with respect to one another, at least in the direction of the rotation axis, in order to each remain individually aligned with respect to the profile of the section with which the inner side of the shoe segment is in engagement.

20. A moulding device for moulding three-dimensional food products from a mass of foodstuff which can be transferred by pumping, comprising:
a frame,
a moulding plate and a moulding plate drive, which moulding plate has a length and a width and is connected to the frame so as to be movably drivable to and fro in the longitudinal direction, wherein the moulding plate has a first outer surface and a second outer surface situated opposite,
wherein cavities are present in the moulding plate, viewed in the direction of the width of the moulding plate, which cavities are at a distance from one another, viewed in said direction, wherein each cavity is embodied as a through-opening in the moulding plate between the first and second outer surfaces, and wherein the cavities each define a filling opening on the first outer surface of the moulding plate,
- a mass feed device which is arranged in a filling position in the frame, wherein the mass feed device is provided with:
- an inlet for feeding a mass of foodstuff by means of a pump in into the mass feed device,
- a shoe member which adjoins the first outer surface of the moulding plate, wherein the shoe member comprises a filling mouth which is connected to the inlet and ends at the first outer surface of the moulding plate in such a way that the filling openings of cavities which move past during the to and fro movement of the moulding plate come into contact with said filling mouth in order to fill said cavities with the foodstuff as the cavities move past, wherein the moulding device has a base member which is arranged stationary with respect to the frame and opposite the shoe member, which base member adjoins the second outer surface of the moulding plate so that the cavities are each closed off at the side opposite the filling opening by a bottom, wherein the first outer surface of the moulding plate is embodied as a profiled outer surface having a shaping profile which, for each cavity, comprises at least one of one or more projections which extend in the longitudinal direction of the moulding plate and of one or more grooves which extend in the longitudinal direction of the moulding plate and through the cavity, and in wherein the shoe member is provided with multiple shoe segments which are arranged next to one another, viewed in the direction of the width of the moulding plate, and wherein each shoe segment has an inner side which adjoins an associated section of the first outer surface of the moulding plate, which section comprises a series of one or more cavities, wherein the inner side of each shoe segment is embodied as a profiled inner side having a profile which comprises, for each series of one or more cavities, at least one of one or more grooves extending in the longitudinal direction of the moulding plate and of ribs extending in the longitudinal direction of the moulding plate, which grooves and/or ribs are in meshing engagement with the shaping profile of said section, and wherein the shoe segments of the shoe member have a freedom of movement with respect to one another, at least in the direction of the width of the moulding plate, in order to each remain individually aligned with respect to the profile of the section with which the inner side of the shoe segment is in meshing engagement.

21. A moulding device for moulding three-dimensional food products from a mass of foodstuff which can be transferred by pumping, comprising:
- a frame,
- a moulding plate and a moulding plate drive, which moulding plate has a length and a width and is connected to the frame so as to be movably drivable to and fro in the longitudinal direction, wherein the moulding plate has a first outer surface and a second outer surface situated opposite, wherein cavities are present in the moulding plate, viewed in the direction of the width of the moulding plate, which cavities are at a distance from one another, viewed in said direction, wherein each cavity is embodied as a through-opening in the moulding plate between the first and second outer surfaces, and wherein the cavities each define a filling opening in the first outer surface of the moulding plate,
- a mass feed device which is arranged in a filling position in the frame, wherein the mass feed device is provided with:
- an inlet for feeding a mass of foodstuff by means of a pump into the mass feed device,
- a shoe member which adjoins the first outer surface of the moulding plate, wherein the shoe member comprises a filling mouth which is connected to the inlet and ends at the first outer surface of the moulding plate in such a way that the filling openings of cavities which move past during the to and fro movement of the moulding plate come into contact with said filling mouth in order to fill said cavities with the foodstuff as the said cavities move past, wherein the moulding device has a base member which is arranged stationary with respect to the frame and opposite the shoe member, which base member is adjacent to the second outer surface of the moulding plate so that the cavities are each closed off at the side opposite the filling opening by a base, wherein the second outer surface of the moulding plate is embodied as a profiled outer surface having a shaping profile which comprises, for each cavity, at least one of one or more projections which extend in the longitudinal direction of the moulding plate and of one or more grooves which extend in the longitudinal direction of the moulding plate and through the cavity, and wherein the base member is provided with multiple shoe segments which are arranged next to one another, viewed in the direction of the width of the moulding plate, and wherein each shoe segment of the base member has an inner side which adjoins an associated section of the second outer surface of the moulding plate, which section comprises a series of one or more cavities, wherein the inner side of each shoe segment is embodied as a profiled inner side having a profile which, for each series of cavities, comprises at least one of one or more grooves extending in the longitudinal direction of the moulding plate and of one or more ribs extending in the longitudinal direction of the moulding plate, which at least one of one or more grooves and of one or more ribs are in meshing engagement with the shaping profile of said section, and wherein the shoe segments of the base member have a freedom of movement with respect to one another, at least in the direction of the width of the moulding plate, in order to each remain individually aligned with respect to the profile of the section with which the inner side of the shoe segment is in meshing engagement.

* * * * *